United States Patent
Beshai

(10) Patent No.: US 7,519,053 B2
(45) Date of Patent: Apr. 14, 2009

(54) MULTI-SPEED ROTORSWITCH

(75) Inventor: Maged E. Beshai, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 633 days.

(21) Appl. No.: 11/211,158

(22) Filed: Aug. 24, 2005

(65) Prior Publication Data

US 2007/0047541 A1 Mar. 1, 2007

(51) Int. Cl.
*H04Q 11/06* (2006.01)
(52) U.S. Cl. .................. 370/380; 370/388; 370/387; 370/386
(58) Field of Classification Search .............. 370/380, 370/370, 369, 367, 387, 388
See application file for complete search history.

(56) References Cited

U.S. PATENT DOCUMENTS 5,469,432 A * 11/1995 Gat ........................... 370/389
5,745,486 A * 4/1998 Beshai et al. ........... 370/395.71
6,646,986 B1 * 11/2003 Beshai ..................... 370/230.1
2003/0053417 A1 * 3/2003 Munter et al. ............... 370/244
2004/0141494 A1 * 7/2004 Beshai et al. ............... 370/352

* cited by examiner

*Primary Examiner*—Daniel J Ryman
*Assistant Examiner*—Andrew Oh
(74) *Attorney, Agent, or Firm*—Anderson Gorecki & Manaras LLP

(57) ABSTRACT

A multi-grained high-performance rotorswitch scaling to high capacities is disclosed. In one embodiment, the rotorswitch comprises common-memory switch modules each of which cyclically accessing each other switch module for an access interval of a predefined value and transmitting, during the access interval, a number of data segments collectively having a duration not exceeding the access interval. The data segments transmitted to a given switch module during an access interval may be destined to several other switch modules. The switch modules may cyclically connect to each other using a plurality of rotators of the same rotational speed. In another embodiment, the rotorswitch uses rotators of different speeds connecting common-memory switch modules so that each of the switch modules has parallel cyclic access, possibly at different cyclic rates, to each other switch module.

20 Claims, 28 Drawing Sheets

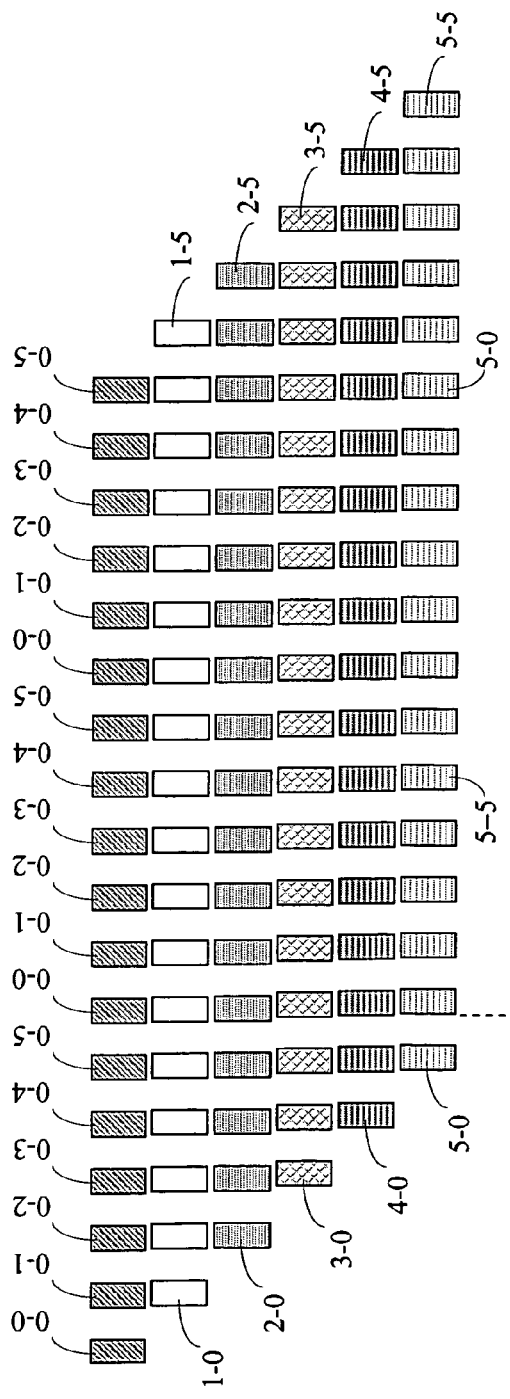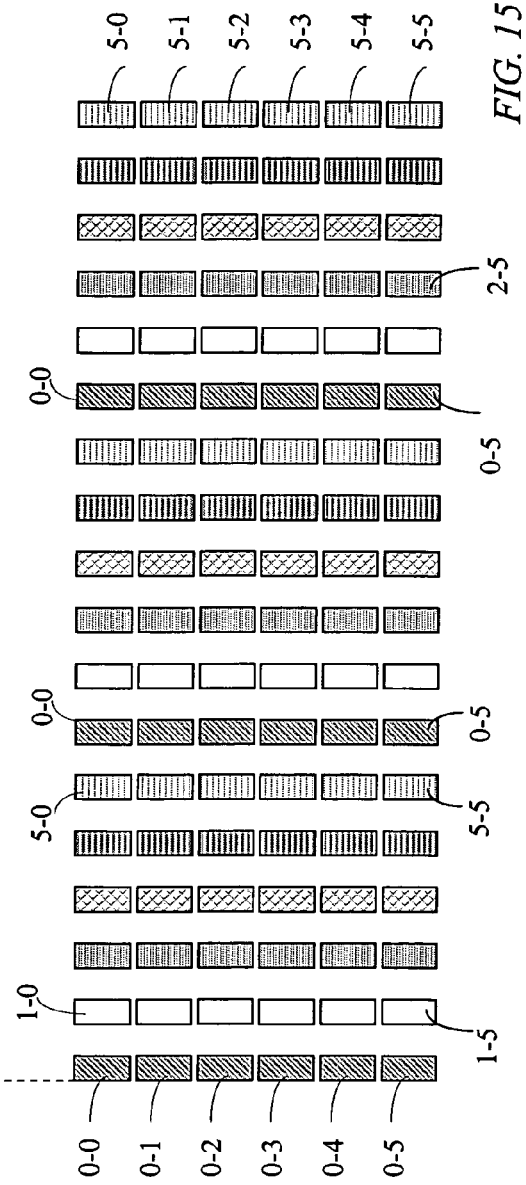
FIG. 15

MULTI-SPEED ROTORSWITCH

FIELD OF THE INVENTION

The present invention relates to switching nodes in telecommunication networks and, in particular, to a versatile multi-grained switching node.

BACKGROUND

The main building block in a telecommunication network is a switching node, and a major factor that influences the shape of the network is the degree of each switching node. The nodal degree of a specific switching node is the number of adjacent nodes to which the specific node directly connects. As the nodal degree increases, the network diameter decreases rapidly; the network diameter being an indication of the number of intermediate nodes traversed by a path from a source edge node to a sink edge node. A decrease in network diameter decreases network complexity and improves network performance. A switching node of large dimension (hence large degree) can connect to a large number of adjacent nodes, hence reducing the diameter of the network.

Present switching nodes include time-division-multiplexed (TDM) switches developed for telephony services, data switches—such as Asynchronous-Transfer-Mode (ATM) switches—intended for networks planned to handle data segments of equal size, Internet-Protocol (IP) routers used to distribute packets of variable size, and coarse TDM cross-connectors such as SONET (Synchronous Optical Network) nodes and SDH (Synchronous Digital Hierarchy) nodes used for managing the capacity of optical links interconnecting switching nodes.

New network services having diverse flow rates, varying, for example, from 1 kilobit per second to 100 megabits per second, would naturally call for a scalable multi-granular edge node capable of efficiently switching data of distinctly different granularities and interfacing with core nodes of different types. An envisaged multi-grained high-capacity network may include legacy IP core routers in addition to optical time-shared core switches such as optical TDM switches and optical burst switches for switching bursts of relatively long duration. There is a need, therefore, to develop multi-grained edge nodes capable of interfacing with a variety of core switches operating at distinctly different granularities.

SUMMARY

The invention provides a multi-grained switch, called a rotor switch, based on cyclic interconnection of switch modules, for use in a telecommunication network serving data streams of widely varying flow rates.

In accordance with an aspect of the present invention, there is provided a multi-speed rotorswitch comprising: a plurality of switch modules each switch module having a module controller; a plurality of rotator groups; and a master controller operable to communicate with the module controller of the each switch module. Each rotator group includes a set of clockwise rotators where each clockwise rotator is associated with a respective rotation speed from among a plurality of predefined rotation speeds; and a set of counterclockwise rotators where each counterclockwise rotator is associated with the respective rotation speed. Each switch module is connected to at least one of the clockwise rotators and to at least one of the counterclockwise rotators of at least one of the rotator groups and is operable to: receive connection requests each connection request indicating a destination switch module and a specified flow rate; determine an internal data-unit size from among a plurality of predefined data-unit sizes according to the specified flow rate; and communicate the specified flow rate and internal data-unit size to the master controller. The master controller is operable to select one of the clockwise rotators and one of the counterclockwise rotators for connecting the each switch module to the destination switch module.

In accordance with another aspect, there is provided a multi-speed rotorswitch comprising: a plurality of switch modules each switch module having a module controller; and a plurality of transit planes. The each switch module connects to at least one of the transit planes and each transit plane includes: a clockwise rotator associated with a respective rotation speed from among a plurality of predefined rotation speeds; a counterclockwise rotator associated with the respective rotation speed; and a bank of transit-memory devices connecting the clockwise rotator to the counterclockwise rotator. The predefined rotation speeds preferably bear rational relationships to each other.

Each transit-memory device is associated with a transit controller. The rotorswitch further includes a master controller operable to communicate with the module controller of each switch module and with the transit controller of each transit-memory device. Each of the switch modules is operable to: receive connection requests each connection request indicating a destination switch module and a specified flow rate; determine an internal data-unit size from among a plurality of predefined data-unit sizes according to the specified flow rate; and communicate the specified flow rate and internal data-unit size to the master controller for selecting one of the transit planes for connecting the each switch module to the destination switch module.

In accordance with a further aspect of the present invention, there is provided a multi-grained rotorswitch comprising a plurality of switch modules wherein each of the switch modules: cyclically connects to each other switch module during a rotation cycle, the rotation cycle comprising a predetermined number of rotation phases; and transmits during a rotation phase to a switch module from among the plurality of switch modules a number of data segments collectively occupying a time period not exceeding a duration of the rotation phase. The data segments may be destined for more than one switch module.

The multi-grained circulating switch may further include a switch-module controller associated with each of the switch modules and a master controller in communication with each switch-module controller. The switch-module controller is operable to: receive connection requests from traffic sources, each connection request specifying a destination switch module and a flow rate; determine a data-segment duration from a plurality of predefined data-segment durations according to the flow rate; communicate the connection request to the master controller; receive a schedule for transmitting a succession of data segments; formulate the succession of data segments; and transmit the succession of data segments to the destination switch module.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 15 illustrates formation of data blocks in a common memory shared by six data streams;

FIG. 24 illustrates the connectivity, through two clockwise rotators of different speeds, of a switch module to other switch modules in a multi-speed circulating switch of the type illustrated in FIG. 12, in accordance with an embodiment of the present invention;

FIG. 25 illustrates the connectivity, through two counterclockwise rotators of different speeds, of a switch module to other switch modules in a multi-speed circulating switch of the type illustrated in FIG. 12, in accordance with an embodiment of the present invention;

TERMINOLOGY

Figure 1:
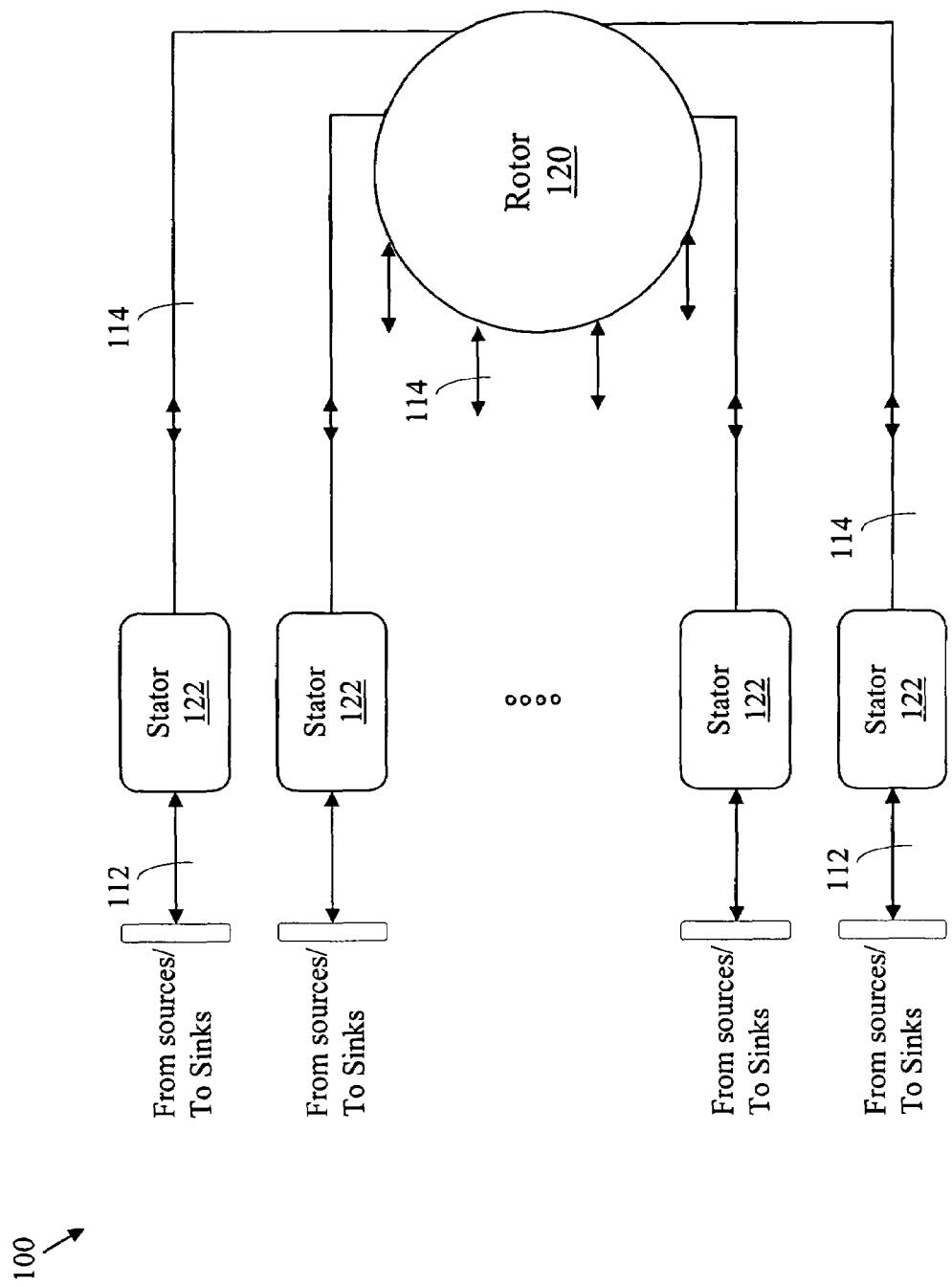
FIG. 1 illustrates a generic rotorswitch having a plurality of stators interconnected by a rotor, in accordance with an embodiment of the present invention.

Some of the frequently used terms are defined below:

Rotator: A passive device which cyclically establishes one-to-one connections between a plurality of inlets and a plurality of outlets. The rotators used in this disclosure are 'square rotators', each having inlet ports numbered 0 to (N−1) and output ports numbered 0 to (N−1), where N is an integer which may vary from 2 to a relatively large number; 16384 for example. The rotators used in this disclosure may be programmable where the input-output connectivity pattern may be modified. A rotator may be electronic-based or photonic-based.

Clockwise rotator: A clockwise rotator cyclically connects each inlet port to outlet ports in an ascending cyclic sequential order, modulo N, N being the number of dual ports of the rotator (a dual port includes an inlet port and an outlet port).

Counterclockwise rotator: A counterclockwise rotator cyclically connects each inlet port to outlet ports in a descending cyclic sequential order, modulo N, N being the number of dual ports of the rotator.

Complementary rotator-pair: A clockwise rotator and a counterclockwise rotator, each having N inlet ports and N outlet ports interconnecting N switch modules, form a complementary-rotator pair if one of the two rotators cyclically connects each switch module to other switch modules in a given cyclic sequential order, modulo N, while the other rotator cyclically connects each switch module to other switch modules in the reverse cyclic sequential order of the given cyclic sequential order.

Connection: The term 'connection' refers to a designated path from a source switch module to a sink switch module of a switch comprising a plurality of switch modules each operating as a source switch module and a sink switch module.

Flow-rate allocation: This refers to the capacity, usually expressed in bits per second, allocated to a connection to support a specified flow rate.

Direct connection: A connection from a source switch module to a sink switch module that does not traverse an intermediate switch module is a direct connection. In a single-rotator circulating switch, a direct connection traverses the single rotator once. In a multiple-rotator circulating switch, a direct connection traverses only one of the rotators.

Indirect connection: A connection from a source switch module to a sink switch module through an intermediate switch module is an indirect connection. In a single-rotator circulating switch, an indirect connection traverses the single rotator twice. In a multiple-rotator circulating switch, an indirect connection may traverse any two rotators, preferably of opposite rotation direction.

Forward rotator: The first rotator, which may be a clockwise rotator or a counterclockwise rotator, traversed by an indirect connection is called a forward rotator.

Terminating rotator: The second rotator, which may be a counterclockwise rotator or a clockwise rotator, traversed by an indirect connection is called a terminating rotator.

Inward link: A link from a rotator to a switch module is referenced as an inward link.

Outward link: A link from a switch module to a rotator is referenced as an outward link.

Inner and Outer ports: In a switch module, a port receiving data from subtending traffic sources is an ingress port; a port transmitting data to subtending traffic sinks is an egress port. A port transmitting data to a rotator is an outbound port and a port receiving data through a rotator is an inbound port. Ingress and egress ports are outer ports while inbound and outbound ports are inner ports.

Rotation phase: A period of time during which a rotator maintains a particular inlet-outlet connectivity is called a 'rotation phase'.

Rotation cycle: The period of time during which a rotator completes a predetermined inlet-outlet connectivity pattern is called a 'rotation cycle'. A rotation cycle includes an integer number of rotation phases.

Time slot: The duration of a rotation phase, which may be used as a reference time duration, is called a time slot.

Time frame: A time frame comprises a number of time slots equal to the number of phases in a rotation cycle.

Data segment: A data stream may be divided into units each called a 'data segment'.

Data frame: A predetermined number of data segments form a data frame.

Directed switch module pair: A source switch module (an origin switch module) and a sink switch module (a destination switch module) form a directed switch-module pair where data flows from the source switch module to the sink switch module.

Switching delay: The delay between receipt of a data segment at a switch module and the transmission of the same data segment by the switch module is called a switching delay.

Transit delay: In a rotorswitch having a number of switch modules, a data unit from a source switch module to a sink switch module may be held in an intermediate (transit) switch module for a period of time, herein called 'transit delay'. An important property of a rotorswitch is that the transit delay of a data unit transferred from a specific source switch module to a specific sink switch module is constant and independent of the transit switch module used to hold the data unit.

DETAILED DESCRIPTION

FIG. 1 illustrates a generic rotorswitch comprising a plurality of stators 122 interconnected by a rotor 120 through internal bidirectional links 114. Each stator 122 may receive data from an external node or from associated data sources and transmit data to an external node or to associated data sinks through external bidirectional links 112. Each stator 122 may transfer data to another stator either directly by traversing the rotor 120 once, or indirectly through an intermediate stator, thus traversing the rotor 120 twice. A stator 122 may include data memories to hold data units until the data units are released according to a schedule or according to a contention-resolution decision.

A stator 122 may comprise independently controlled switch units, as in the case of the rotating-access switch to be described with reference to FIG. 2. Alternatively, a stator 122 may be an integrated switch module, as in the case of the circulating switch to be described below with reference to FIG. 4. A rotor 120 may comprise a number of rotators interconnecting the stators 122 in various ways. The rotators are generally passive and memoryless.

Figure 2:
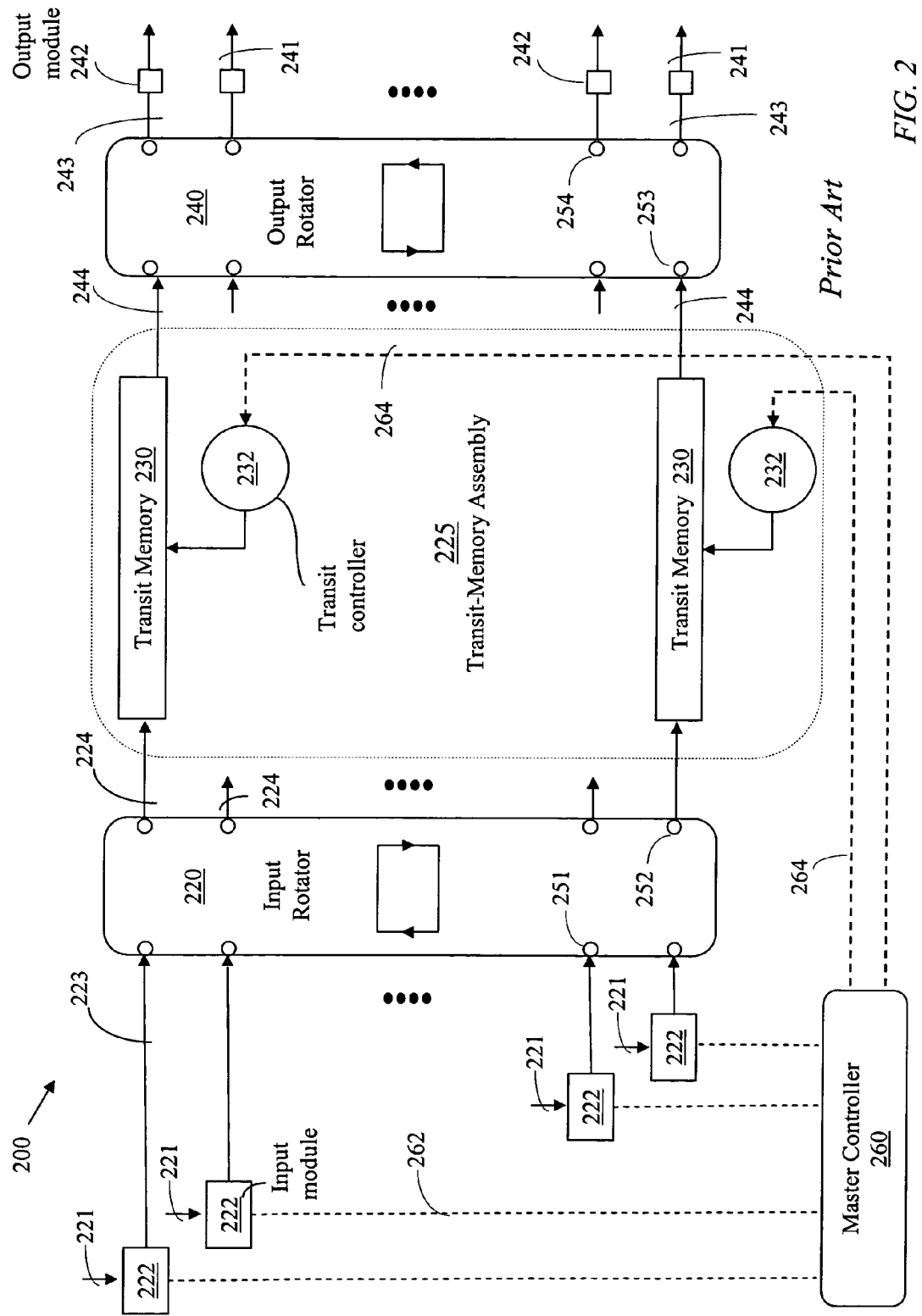
FIG. 2 illustrates a known rotating-access switch having an input rotator connecting input modules to transit memory devices and an output rotator connecting the transit memory devices to output modules.

FIG. 2 illustrates an implementation of a rotorswitch 200 where the rotor comprises an input rotator 220 and an output rotator 240, and the stators include input modules 222, a transit-memory assembly 225, and output modules 242. The transit-memory assembly 225 includes a bank of transit-memory devices 230 connecting the input rotator 220 to the output rotator 240. Input rotator 220 has a number of inlets 251 at least equal to the number of input modules 222 and a number of outlets 252 at least equal to the number transit-memory devices 230. Output rotator 240 has a number of inlets 253 at least equal to the number of transit-memory devices 230 and a number of outlets 254 at least equal to the number of output modules 242. The input rotator 220 and the output rotator 240 have opposite rotation directions. Each transit-memory device 230 has an associated transit controller 232. Each input module 222 receives data from subtending data sources or from an external node (not illustrated in FIG. 2) through an input channel 221 and arranges the received data into data segments or larger data blocks, where a data block contains a number of data segments. Each input module 222 has a channel 223 to an inlet 251 of input rotator 220 and each outlet 252 of input rotator 220 has a channel 224 to a transit memory device 230. Each transit memory device 230 has a channel 244 to an inlet 253 of output rotator 240 and each outlet 254 of output rotator 240 has a channel 243 to an output module 242. An output module 242 transmits data read from the transit-memory devices 230 to subtending data sinks or to another switch (not illustrated in FIG. 2) through an output channel 241. Input rotator 220 cyclically connects each input module 222 to each transit-memory device and output rotator 240 cyclically connects each transit-memory device 230 to each output module 242. A master controller 260 is communicatively coupled to each input module 222, through a dual channel 262, and to each transit controller 232, through a dual channel 264, where a dual channel includes two channels of opposite directions. In operation, when a memory division in a transit memory device 230 is reserved to hold a data segment, the memory division is marked as occupied and when the data segment is transmitted to an output module, or to multiple output modules in a multicast mode, the memory division is marked as free.

Master controller 260 is operable to determine schedules for data transfer from input modules 222, through input rotator 220, to transit memory devices 230.

The input rotator 220 may be configured to periodically repeat an input-configuration cycle having a predefined sequence of input transfer configurations. Likewise, the output rotator 240 may be configured to periodically repeat an output-configuration cycle having a predefined sequence of output transfer configurations. The output transfer configuration is preferably a mirror image of the input transfer configuration so that when an input module 222 associated with a specific output module 242 connects to a transit-memory device 230, during a part of a time slot in a rotator cycle, the same transit-memory device 230 connects to the specific output module 242 during another part of the same time slot. It is sufficient, therefore, to focus on the operation of the input rotator 220.

The connectivity of each input rotator 220 can take any cyclic order. Consider, for example, an input rotator 220 having eight inlets 251-0, 251-1, 251-2, 251-3, 251-4, 251-5, 251-6, and 251-7 and eight outlets 252-0, 252-1, 252-2, 252-3, 252-4, 252-5, 252-6, and 252-7. Inlet 251-0 may connect consecutively to outlets 252-0 to 252-7 starting with outlet 252-0 during the first rotation phase of a rotation cycle and proceeds to connect to outlet 252-1 during the second rotation phase of the rotation cycle, and so on. Alternatively, inlet 251-0 may connect to outlet 252-4 during the first rotation phase of the rotation cycle and proceed to outlets 252-5, 252-6, 252-7, 252-0, 252-1, 252-2 and 252-3 during the subsequent rotation phases of the rotation cycle. In general, input j, $0 \leq j < N$, connects to output $[j + \alpha \times t + \phi]$ modulo N, where t, $0 \leq t < N$, denotes a rotation phase, N is the number of transit memory devices per rotorswitch 200, $\alpha$ is a rotation direction and equals 1 or $-1$ and $\phi$ is a fixed phase shift expressed as a number of rotation phases. The value of $\phi$ varies between 0 and $(N-1)$. The rotation phase, t, takes a value ranging from zero to $(N-1)$.

Figure 3:
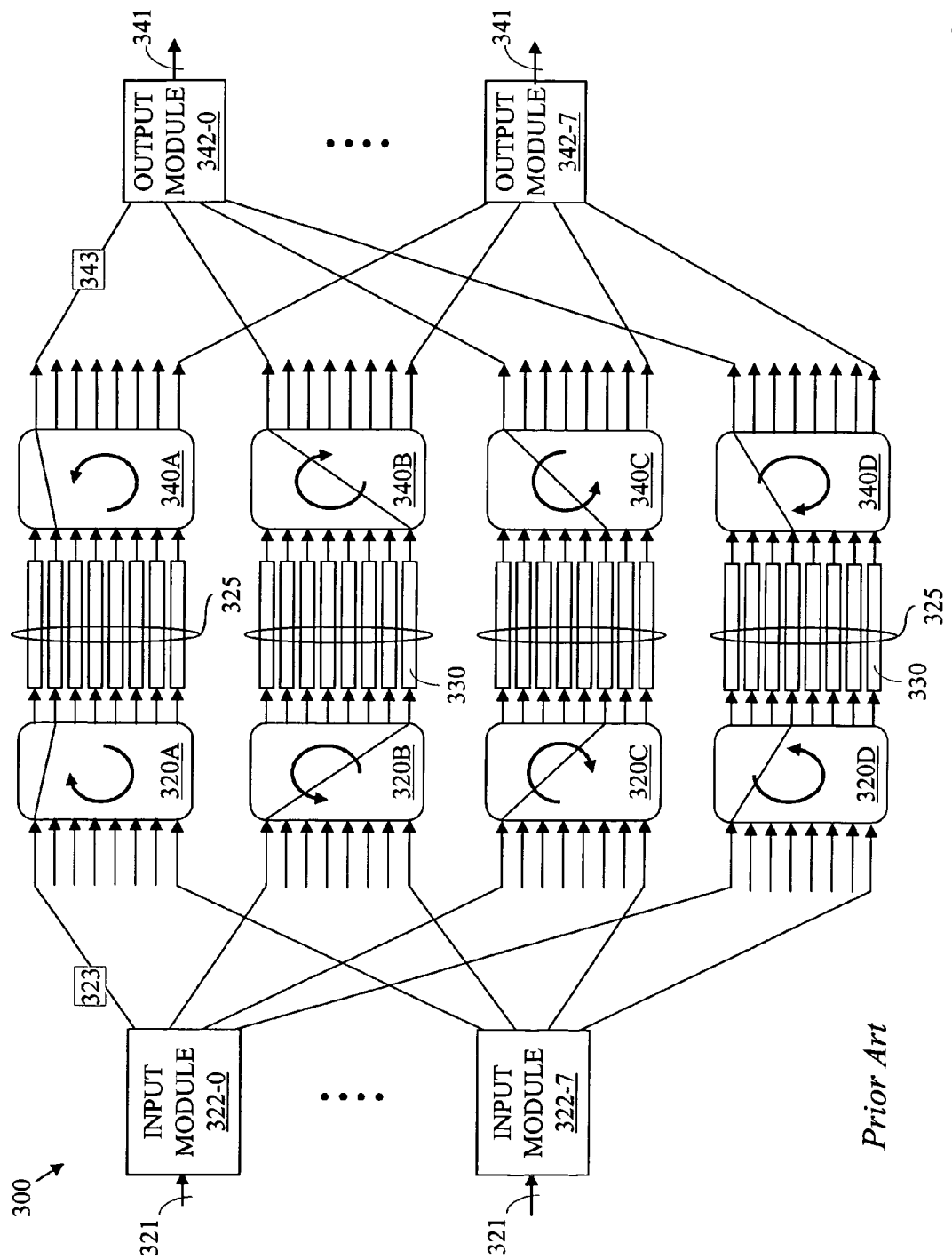
FIG. 3 illustrates a known rotating-access switch having a plurality of input modules, a plurality of output modules, a plurality of sets of transit memory devices, a plurality of input rotators each connecting the input modules to one of the sets of transit memory devices, and a plurality of output rotators each connecting one of the sets of transit memory devices to the output modules.

FIG. 3 illustrates an exemplary rotorswitch 300 in which the rotor comprises four input rotators 320A, 320B, 320C, 320D, referenced individually or collectively as 320, and four output rotators 340A, 340B, 340C, 340D, referenced individually or collectively as 340. The stators include eight input modules 322-0, ..., 322-7 (referenced collectively or individually as 322), four transit-memory assemblies 325A, 325B, 325C, and 325D (referenced collectively or individually as 325), and eight output modules 342-0, ..., 342-7 (referenced collectively or individually 342). Each input module 322 receives data through an input channel 321 and each output module 342 transmits data through an output channel 341. An input rotator 320, a transit-memory assembly 325, and an output rotator 340 function as a space switch. The four input rotators 320A, 320B, 320C, 320D may operate at an offset from each other and each of four output rotators 340A, 340B, 340C, 340D rotates in the opposite direction of a corresponding input rotator 320. In this example, two input rotators 320A and 320C rotate in a clockwise direction while the other two input rotators 320B and 320D rotate in the counterclockwise direction. Module controllers and a master controller have been omitted from FIG. 3 to simplify the illustration. Each transit-memory assembly 325 comprises a bank of transit memory devices 330. Each input rotator 320 cyclically connects eight channels 323 received from the eight input switch modules 322 to the transit memory devices 330 to which the input rotator 320 connects and each output rotator 340 cyclically connects the transit memory devices 330, to which the output rotator 340 connects, to eight channels 343, each channel 343 leading to one of the output switch modules 342.

Figure 4:
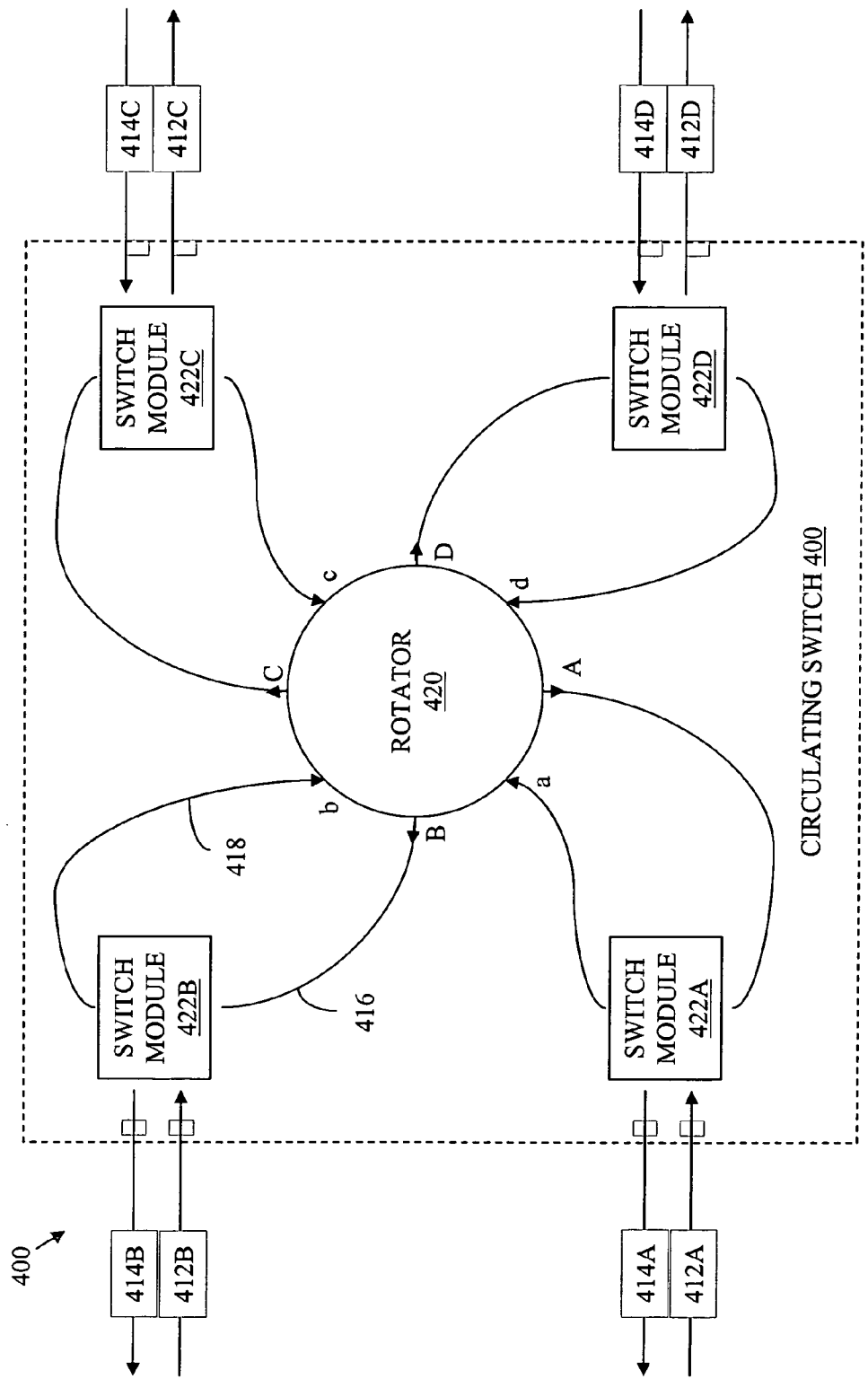
FIG. 4 illustrates a known circulating switch comprising a plurality of switch modules interconnected by a single rotator.

The rotor 120 of generic rotorswitch 100 of FIG. 1 may be implemented as a single rotator as illustrated in rotorswitch 400 of FIG. 4, which is described in Applicant's U.S. patent application Ser. No. 10/780,557 filed on Feb. 19, 2004 and titled "Circulating Switch", the specification of which is incorporated herein by reference. Exemplary rotorswitch 400 has four switch modules 422A, 422B, 422C and 422D (collectively or individually 422). Each switch module 422 is an integrated device handling input, output, and transit functions. Each switch module 422 in rotorswitch 400 corresponds to a stator 122 in generic rotorswitch 100. The switch modules 422 are interconnected by rotator 420. The inlets of the rotator 420 are labeled a, b, c, and d and the outlets are labeled A, B, C, and D. Data is sent from one switch module 422 to another switch module 422 either directly, traversing rotator 420 once, or indirectly through any intermediate switch module 422 where rotator 420 is traversed twice. A higher capacity rotorswitch 400 may be constructed using higher-capacity switch modules, implemented as common memory switches for example, having multiple ports interconnected through a rotor comprising a multiplicity of rotators operating in parallel and preferably arranged in complementary groups of rotators of opposite rotation directions as described below with reference to FIG. 6. Higher capacity may also be realized by increasing the number of switch modules 422, which would require a rotator 420 of large dimension (large number of inlet and outlet ports). A polyphase circulating switch having a low transit delay may be derived from a multi-rotator circulating switch by providing programmable rotators having adjustable relative rotator-cycle phases.

As described in the aforementioned U.S. patent application Ser. No. 10/780,557, the data-memory device of each switch module may be logically divided into a shipping section, transit sections, and a receiving section. The transit sections include a transit section corresponding to each rotator with each transit section including a memory division corresponding to each switch module 422.

Each switch module 422 is electronic-based and receives data from an external node or from subtending traffic sources through an ingress link 412, delivers data to an external switching node or to subtending data traffic sinks through an egress link 414, and connects to the rotator 420 through an inbound channel 416 and an outbound channel 418. The rotator 420 may be either electronic or photonic. A photonic rotator requires Electrical-to-Optical and Optical-to-Electrical interfaces (not illustrated). The rotator 420 is a passive memoryless device that provides cyclic interconnection from inlet to outlet, according to a predefined inlet-outlet connectivity pattern over a predefined rotation cycle. Although FIG. 4 illustrates only four switch modules 422, it is understood that the number of switch modules 422 is physically limited by the dimension of rotator 420 (i.e., number of dual ports on the rotator 420 where a dual port comprises an inlet port and an outlet port) and operationally limited by the transit delay which increases with the number of switch modules 422 as will be described below.

In operation, a particular switch module 422 receives data streams from an external node or from subtending data traffic sources and organizes the received data into data segments. In one rotation phase of the rotation cycle of rotator 420, a data segment may be transmitted by the particular switch module 422 to a switch module 422 to which the particular switch module connects through rotator 420.

Single Rotator vs. Complementary Rotator-Pair

In its simplest form, the switch module 422 may be based on a common memory and has one dual outer port (a dual port comprising an input port and an output port) connecting to a network link, or to data sources and data sinks. The switch module may have one faster dual inner port, or two dual inner ports each of the same speed as that of the dual outer port, connecting the switch module 422 to the single rotator 120. The switch module receives data segments during arbitrary time slots and transmits the data segments according to a predefined schedule or according to the availability of a path from the switch module to a desired destination. A simple switch module contemplated herein comprises a data memory and an addressing memory (not illustrated). The data memory holds data segments formed from a plurality of data streams, where each data stream may be identified by a destination. The data segments of each data stream are linked within the data memory and the addressing memory contains pointers to a current head data segment and a current tail data segment of each data stream.

Figure 5:
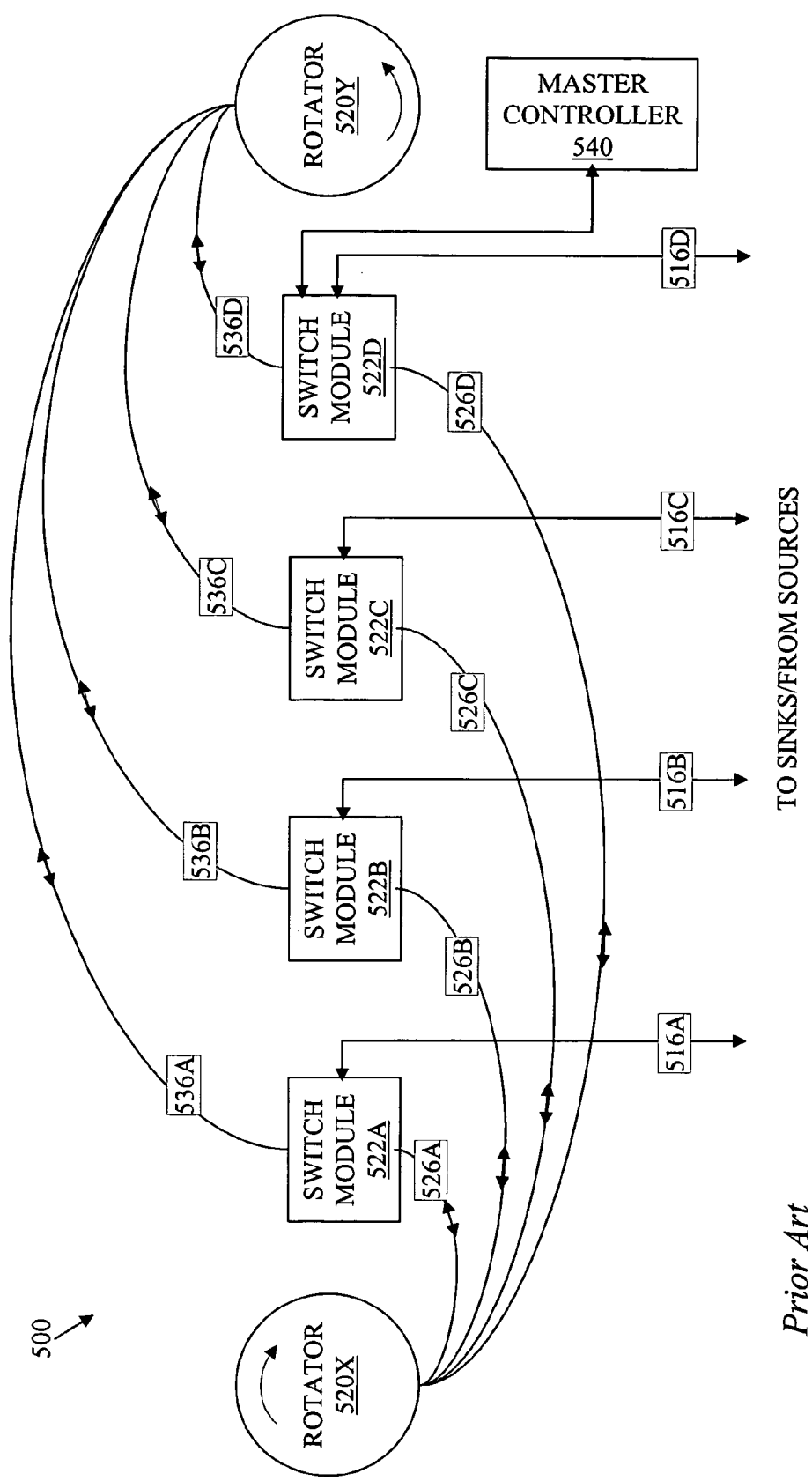
FIG. 5 illustrates a known circulating switch having a plurality of switch modules interconnected by two rotators rotating in opposite directions.

FIG. 5 illustrates, in a simplified representation, a rotor-switch 500 having a rotor including a first rotator 520X and a second rotator 520Y. The second rotator 520Y may be arranged to have a direction of rotation (i.e., a direction of stepping through the phases of a rotation cycle) opposite to the direction of rotation of the first rotator 520X. In such a case, the second rotator 520Y is referenced as being "complementary" to the first rotator 520X, and vice versa. The first rotator 520X may be referenced as a clockwise rotator 520X and, hence, the second (complementary) rotator 520Y may be referenced as a counterclockwise rotator 520Y. The exemplary circulating switch 500 includes four switch modules 522A, 522B, 522C, and 522D (collectively or individually 522).

External dual channels 516A, 516B, 516C, and 516D connect switch modules 522A, 522B, 522C, and 522D, respectively, to external nodes or subtending data sources and data sinks. Internal dual channels 526A, 526B, 526C, and 526D corresponding to switch modules 522A, 522B, 522C, and 522D, respectively, represent inbound channels from the clockwise rotator 520X to the switch modules 522 and outbound channels from the switch modules 522 to clockwise rotator 520X. Likewise, internal dual channel 536A, 536B, 536C, and 536D corresponding to switch modules 522A, 522B, 522C, and 522D, respectively, represent the inbound channels from the counterclockwise rotator 520Y to the switch modules 522 and the outbound channels from the switch modules 522 to the counterclockwise rotator 520Y.

In a common memory device provided in each switch module 522, there may be a transit section corresponding to each of the two rotators 520X, 520Y. Data received at the first switch module 522A for transfer to the second switch module 522B through the first rotator 520X may be written in a corresponding first transit section in the common memory of the first switch module 522A. Likewise, data to be transferred through the second rotator 520Y may be written in a corresponding second transit section in the common memory of the first switch module 522A. However, data read out from the first transit section may be transferred through the second rotator 520Y, and vice versa. It can be shown that the connection of the first switch module 522A to the second switch module 522B through an intermediate switch module (say, the third switch module 522C) and traversing the complementary rotators 520X, 520Y results in a desirable fixed transit delay that is specific to each directed switch module pair (a source switch module and a destination switch module) and is independent of the intermediate switch module used.

Control of the rotorswitch 500 is provided by a master controller 540 communicatively connected to a designated switch module 522D dedicated for the purpose of transferring control instructions to the other switch modules 522, via the rotators 520X and 520Y. Of course, any other switch module 522 may be designated to host the master controller 540. In a rotorswitch 500 having a large number of switch modules 522, a standby master controller may be associated with another switch module 522 for reliability.

The clockwise rotator 520X and the counterclockwise rotator 520Y are illustrated at the left and right ends, respectively, of an array of the switch modules 522. The first internal dual channels 526 connect each of the switch modules 522 to the clockwise rotator 520X and the second internal dual channels 536 connect each of the switch modules 522 to the counterclockwise rotator 520Y.

The external dual channels 516A, 516B, 516C, and 516D corresponding to switch modules 522A, 522B, 522C, and 522D, respectively, connect the switch modules 522 either to network links or to subtending data sources and subtending data sinks. Furthermore, the master controller 540 is communicatively connected to the designated switch module 522D in the illustrated rotorswitch 500.

Multiple-Rotator Circulating Switch

Figure 6:
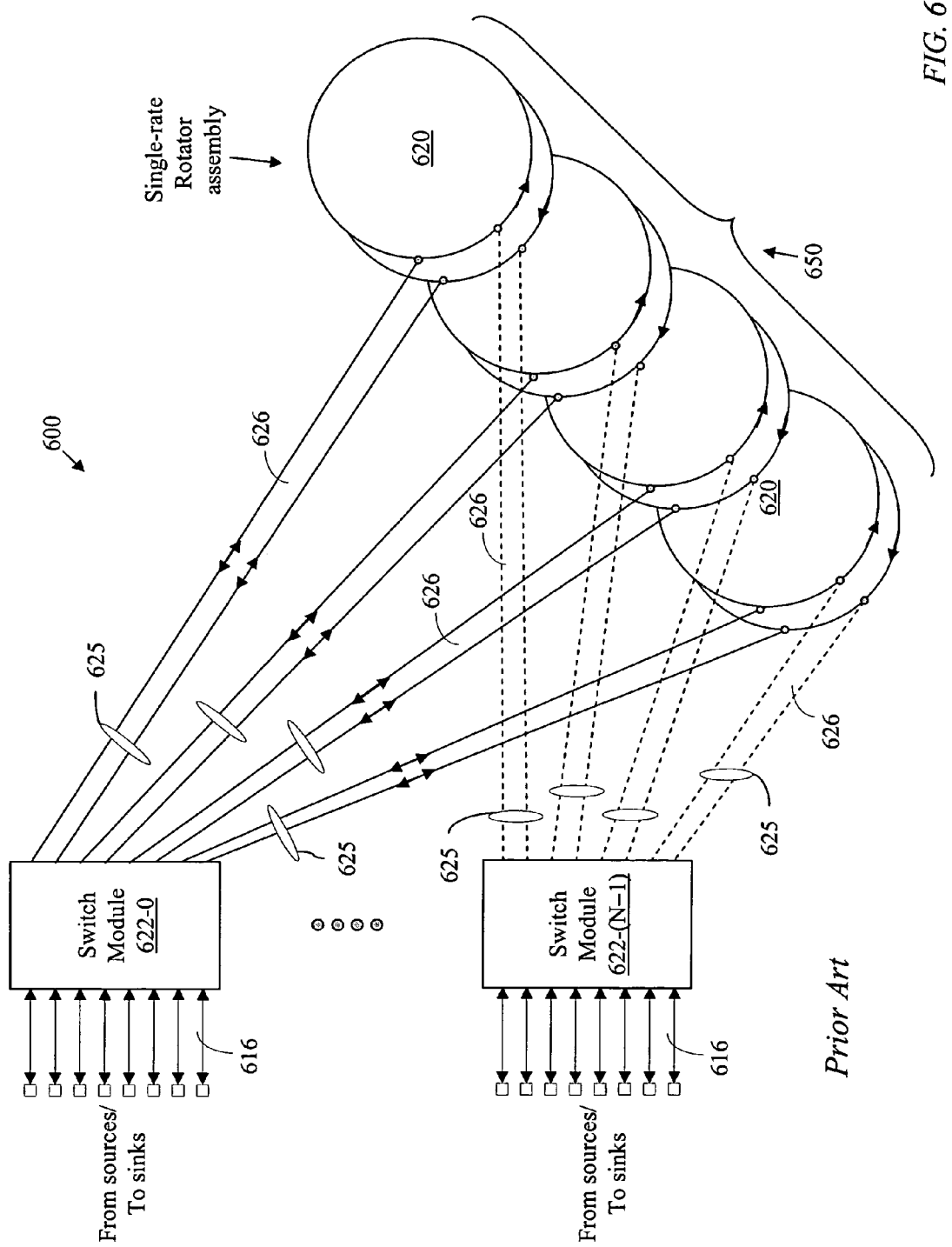
FIG. 6 illustrates a known circulating switch having a plurality of switch modules interconnected by a plurality of clockwise rotators and a plurality of counterclockwise rotators where all rotators have the same rotation speed.

The rotor 120 of generic rotorswitch 100 may include an array of rotators as illustrated in FIG. 6. Rotorswitch 600 of FIG. 6 has a rotator array 650 including eight rotators 620 interconnecting N>1 switch modules 622-0, ..., 622-(N−1), referenced collectively or individually as 622.

Notably, a set of external dual channels 616 connects the switch modules 622 to network links or to data traffic sources and sinks and a set of internal dual channels 626 connects the switch modules 622 to the rotators 620. The set of internal dual channels 626 may be organized into dual-channel pairs 625, where one internal dual channel 626 of a dual-channel pair 625 connects to a clockwise rotator of a complementary pair of rotators 620 and the other internal dual channel 626 of the dual-channel pair 625 connects to a counterclockwise rotator of the complementary pair of rotators 620.

At each switch module 622, during each rotation phase, there is one memory access interval for each ingress port for receiving data from subtending data traffic sources (or from a network link) and there is one memory access interval for each outbound port for transmitting data through one of the rotators 620. There is also one memory access interval for each egress port for transmitting data to a network link or to subtending traffic sinks and there is one memory access interval for each inbound port for receiving data through one of the rotators 620. A conventional common memory switch makes use of a wide memory through a data bus where at least two devices connected to the ports of the common-memory switch have interleaved access to the data bus which is permanently connected to a data memory having at least the same width as the data bus.

The use of complementary pairs of rotators results in a constant transit delay for each directed switch module pair; the delay from a first switch module 622 to a second switch module 622 through any intermediate switch module 622 is the same for a given complementary pair of rotators 620. Additionally, the use of a complementary pair of rotators 620 provides an opportunity to a given switch module 622 to select one of two paths having different transit delays.

Data-Memory Organization

Figure 7:
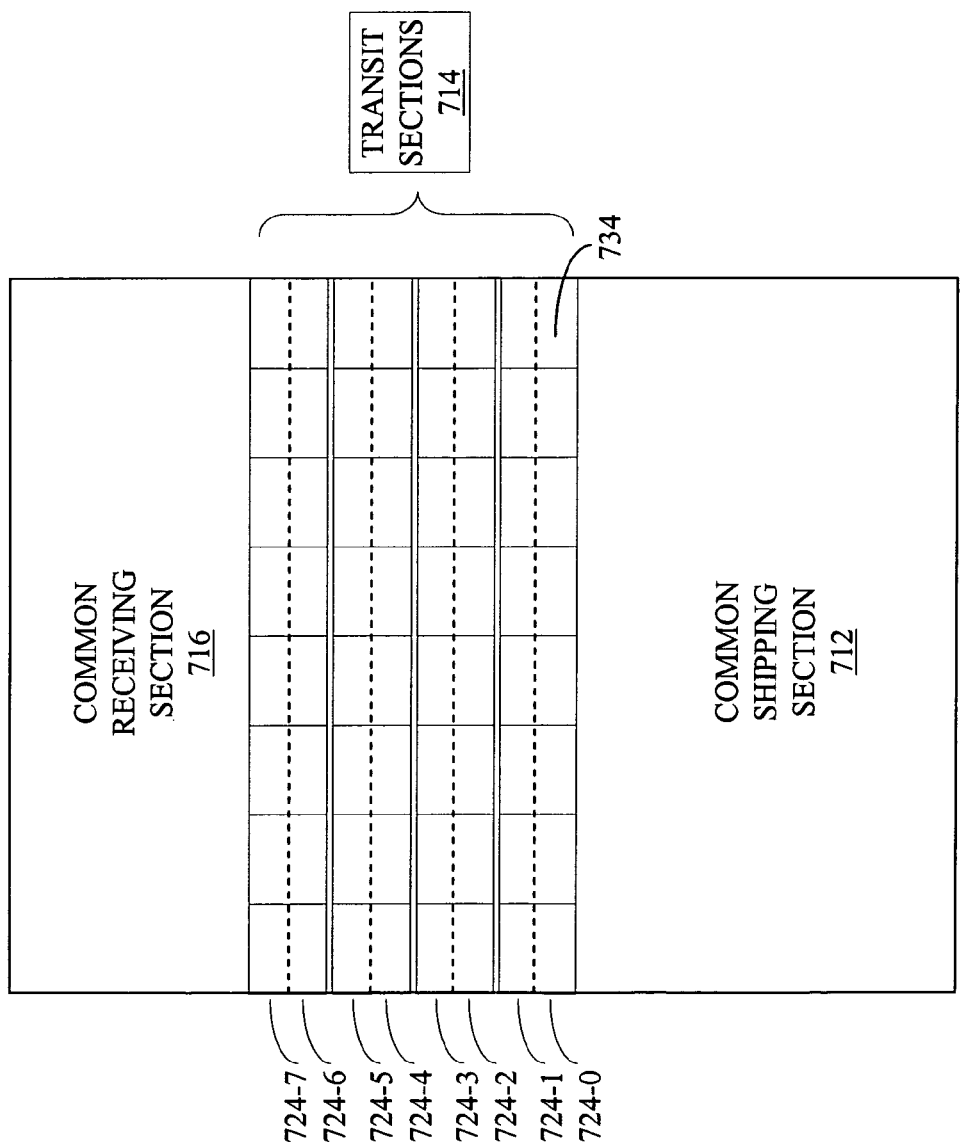
FIG. 7 illustrates an organization of a common memory used in a switch module in the circulating switch of FIG. 6 with a transit section corresponding to each rotator.

To facilitate switching in the circulating switch 600 of FIG. 6, the common memory of each switch module 622 is preferably partitioned logically into three sections as illustrated in FIG. 7 which illustrates an organization of the common memory of a switch module 622 in a circulating switch 600 having four rotators. The common memory is logically divided into a common "shipping" section 712, which contains data segments received from all ingress ports, a block 714 of eight "transit" sections 724-0 to 724-7 (referenced collectively or individually as 724), each transit section 724 corresponding to a rotator 620, and a common "receiving" section 716 containing data segments received from all inbound ports of the switch module 622. During each rotation phase, in a rotorswitch 600 having more than four switch modules 622, a switch module 622 may transmit data to at most four switch modules and receive data from at most four switch modules through the four rotators.

The data segments in the shipping section 712 of a given switch module 622 may be transferred across the rotator 620 to either a transit section 714 or the receiving section 716 of another switch module 622. The transit section 714 of the given switch module 622 may contain data segments to be transferred to a receiving section of another switch module 622 through the rotator 620. The receiving section 616 of any switch module 622 may contain data segments directed to subtending data traffic sinks of the switch module or to an external node through a network link. The data segments in the shipping section 712 are preferably sorted according to their destination switch modules 722.

To facilitate the process of scheduling the transfer of the data segments from a given switch module 622 across the rotators 620, each transit section 724 may be slotted into a number of memory slots (also called transit divisions) 734 at least equal to the number of switch modules 622 minus one, with each memory slot 734 corresponding to one of the switch modules 622 to which the given switch module connects. Each memory slot can hold a predefined number of data segments. The data in the receiving section may be arranged in a single queue, or may be sorted according to some criterion such as the origin switch module, service priority, or some other data stream identifier.

Figure 8:
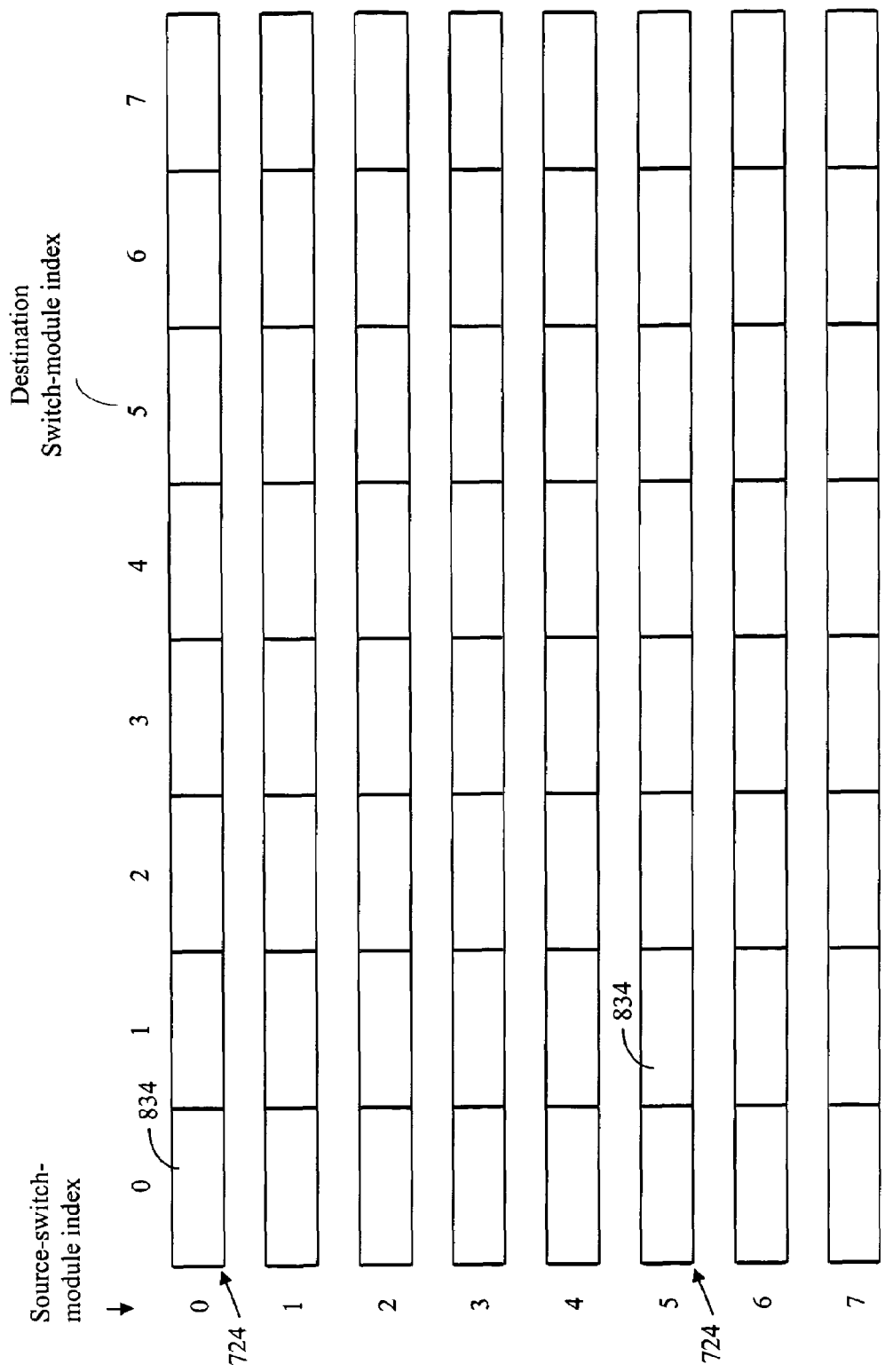
FIG. 8 illustrates an organization of one transit section in each of eight switch modules of a circulating switch of the type illustrated in FIG. 6 where the transit section has a number of memory divisions equal to the number switch modules and each division holds at most a single data segment received from one of said switch modules.

During each rotation phase, each switch module 622X has a path to another switch module 622Y through a rotator, where each of the indices X and Y may vary from 0 to (N−1), with X≠Y, and switch module 622X may transfer a single data block to switch module 622Y; the data block may contain several data segments. The data block may be destined to a data sink associated with switch module 622Y or to a data sink associated with another switch 622T, where the index T varies from 0 to (N−1) with T≠X and T≠Y. If the data block is destined to switch module 622Y, the data block would be written in the receiving section of switch module 622Y. If the data block is destined to switch module 622T, the data block would be written in a memory division corresponding to switch module 622T in the transit section of switch module 622Y. FIG. 8 illustrates an organization of one transit section 724 corresponding to one rotator 620, in each of eight switch modules 622 of a circulating switch 600 having N=8 switch modules 622. Each transit section has a number of memory divisions 834 equal to the number of destination switch modules and each memory division holds at most a single data block received from one of the switch modules 620. A data block may contain more than one data segment. A transit section 724 in switch module 622-X, 0≦X<N, is identified in FIG. 8 by the index X and the destination switch modules 622-Y, 0≦Y<N, corresponding to memory divisions 834 are identified by the index Y. The number of memory divisions may be reduced to seven because a switch module 622 need not connect to itself through a rotator. However, the number of memory divisions may be selected to be equal to N for simplicity of memory addressing.

Figure 9:
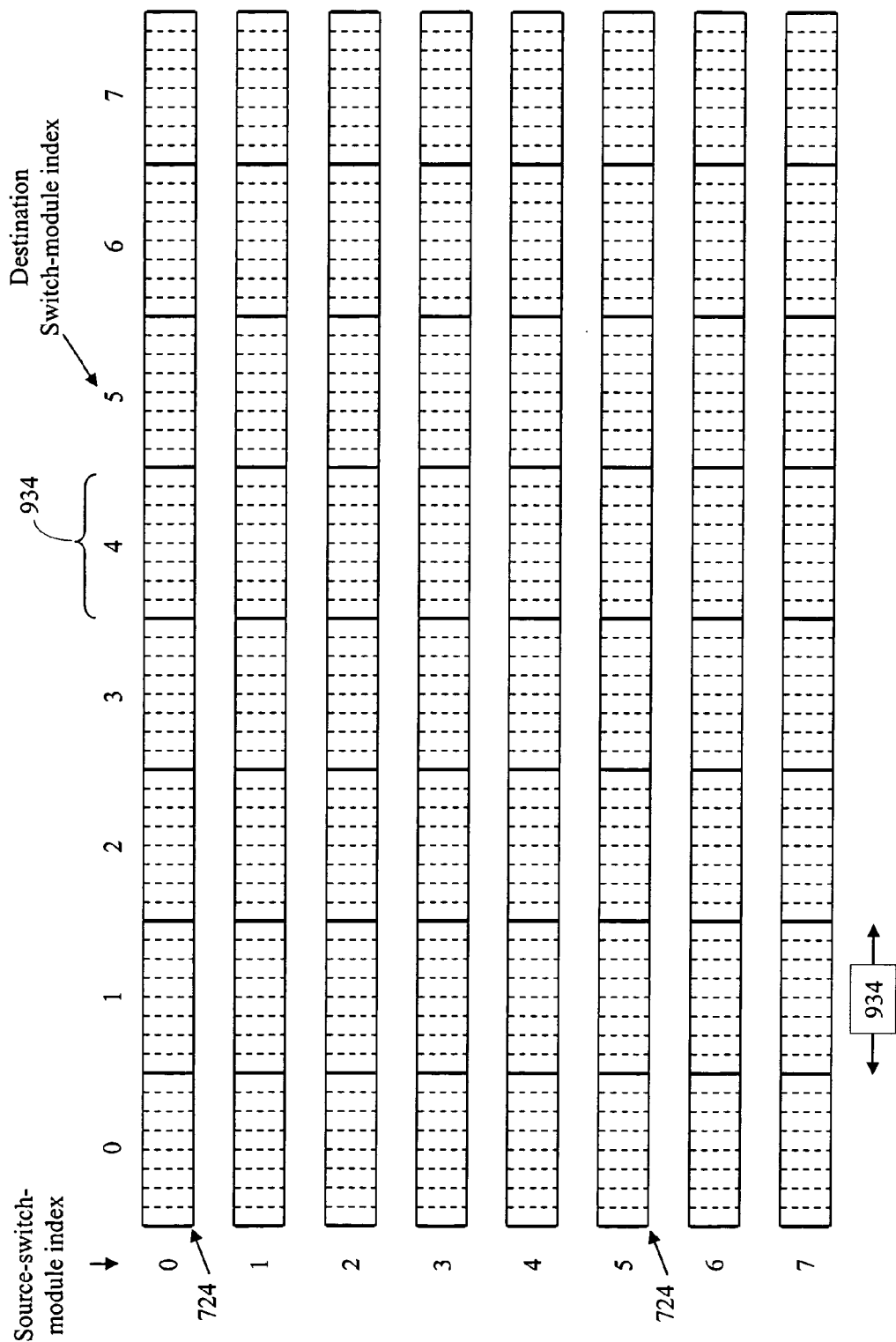
FIG. 9 illustrates an organization of a transit section in each of eight switch modules of a circulating switch of the type illustrated in FIG. 6 where the transit section has a number of memory divisions equal to the number switch modules and each memory division may hold at most a predefined number of data segments received from at least one of said switch modules, in accordance with an embodiment of the present invention.

Alternatively, during each rotation phase, each switch module 622-X may transfer a data block containing several data segments to a switch module 622-Y where the transferred data segments may include data segments destined to switch module 622-Y and data segments destined to switch modules 620 other than switch modules 622-X and switch module 622Y; 0≦X<N, 0≦Y<N, X≠Y. Data segments destined to switch module 622-Y would be written in the receiving section of switch module 622-Y while data segments destined to other switch modules would be written in corresponding memory divisions 734 in transit sections 724, of switch module 622-Y, corresponding to the other switch modules. FIG. 9 illustrates an organization of one transit section 724 in each of eight switch modules 622-0 to 622-7 of a circulating switch 600 having N=8 switch modules where a transit section has a number of memory divisions 934 equal to the number switch modules (or to the number of switch modules minus one) and each memory division 934 holds at most eight data segments. A switch module may transfer data segments destined to several switch modules during a rotation phase. The at most eight data segments may be destined to more than one switch module 622. As in FIG. 8, the switch modules 622-0 to 622-7 are identified only by indices 0 to 7.

For a rotation phase of a predefined duration (e.g., one microsecond) the transit-section organization of FIG. 8 is suitable for a rotorswitch 600 of coarse granularity while the transit-section organization of FIG. 9 is suitable for a switch 600 of finer granularity. Thus, with a rotation-phase of one microsecond duration and a flow rate of 10 Gb/s, a data block of 10 kilobits destined to a single switch module, or eight data segments each of size 1.25 kilobits and destined to one or more switch modules, may be transferred from a switch module 622 across a rotator to another switch module 622. It is noted that the transit-section organization of FIG. 8 may also realize fine granularity by selecting a rotation phase of smaller duration. However, it may be desirable to have a guard time between successive rotation phases and the use of a relatively short rotation phase may result in capacity waste. For example, with a guard time of 10 nanoseconds, the use of a rotation phase of 100 nanoseconds, with one data segment transferred across a rotator per rotation phase, results in a relative capacity loss of 0.10. The use of a rotation phase of 800 nanoseconds, with eight data segments transferred across the rotator per rotation phase, results in a capacity loss of 0.0125 (10 nanoseconds wasted during each rotation phase of 800 nanoseconds).

Figure 10:
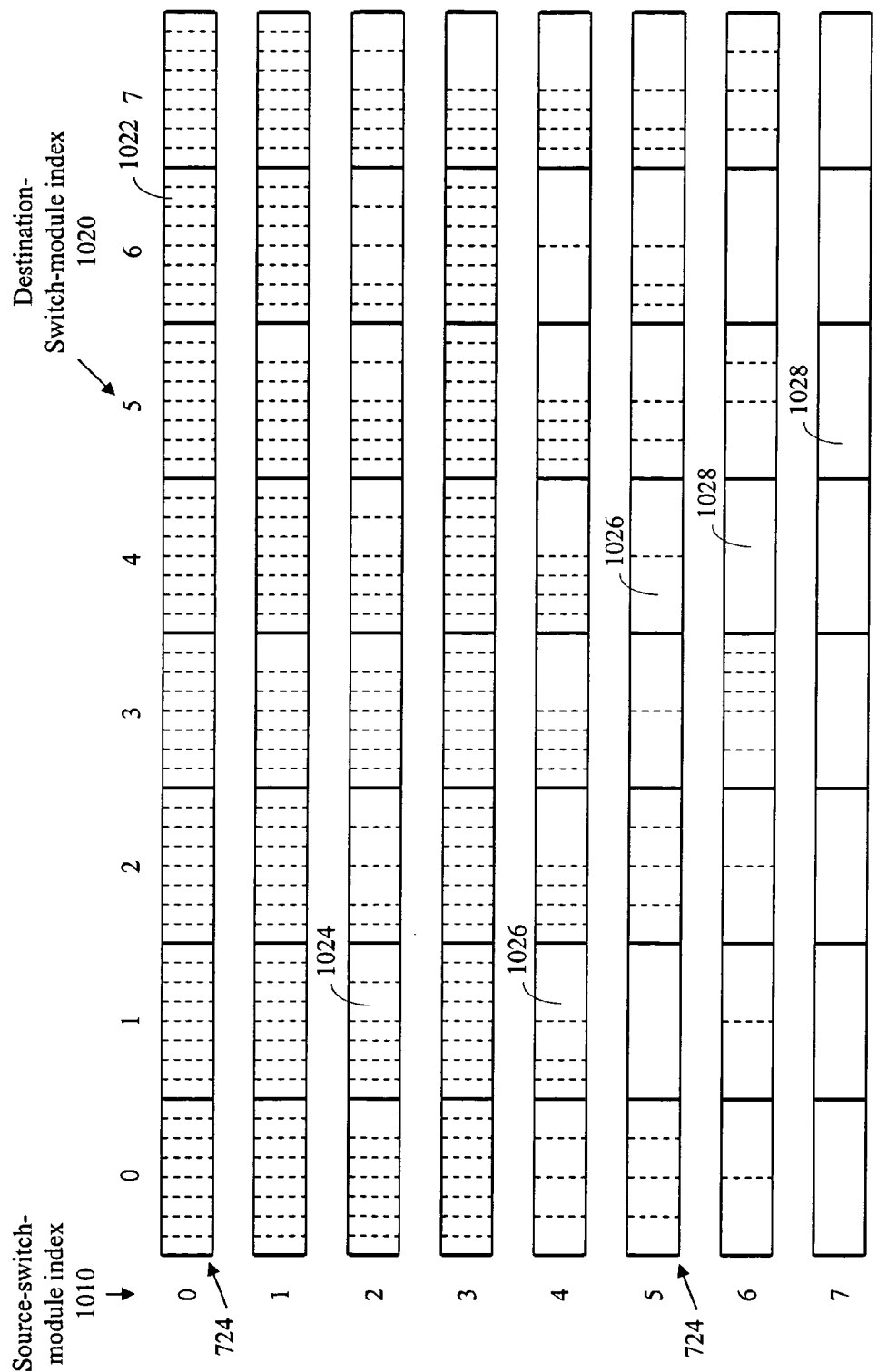
FIG. 10 illustrates an organization of a transit section in each of eight switch modules of a circulating switch of the type illustrated in FIG. 6 where the transit section may hold data segments of unequal durations received from at least one of the switch modules, in accordance with an embodiment of the present invention.

A circulating switch using the transit-section organization of FIG. 9 may also be used for switching data units of different sizes, where a data-unit size is an integer multiple of a predefined minimum size. FIG. 10 illustrates an organization of one transit section 724 in each of eight switch modules 622-0 to 622-7 of a circulating switch 600 having N=8 switch modules. A transit section has a number of memory divisions 1034 equal to the number switch modules (or to the number of switch modules minus one). A memory division 1034 may hold eight data segments 1022, four data blocks 1024 each data block including two data segments, two data blocks each including four data segments, or one data block including eight data segments. A memory division 1034 may also contain a combination of data segments 1022 and data blocks 1024 or 1026. The data segments of a data block are directed to a single destination switch module 622. As in FIGS. 8 and 9, the switch modules 622-0 to 622-7 are identified by indices 0 to 7.

During a rotation phase, each switch module 622 may transfer to another switch module 622 data blocks of arbitrary sizes, possibly destined to more than one other switch module. The total size of data blocks transferred during a rotation phase has a predefined upper bound determined by the data flow rate and the duration of the rotation phase. A scheduler of such a switch may use a packing process for transit data to realize high utilization of the switch fabric. A simple packing process allocates data blocks to available memory divisions in the transit section of a switch module starting the search for available memory divisions from a reference switch module for each connection request.

Figure 11:
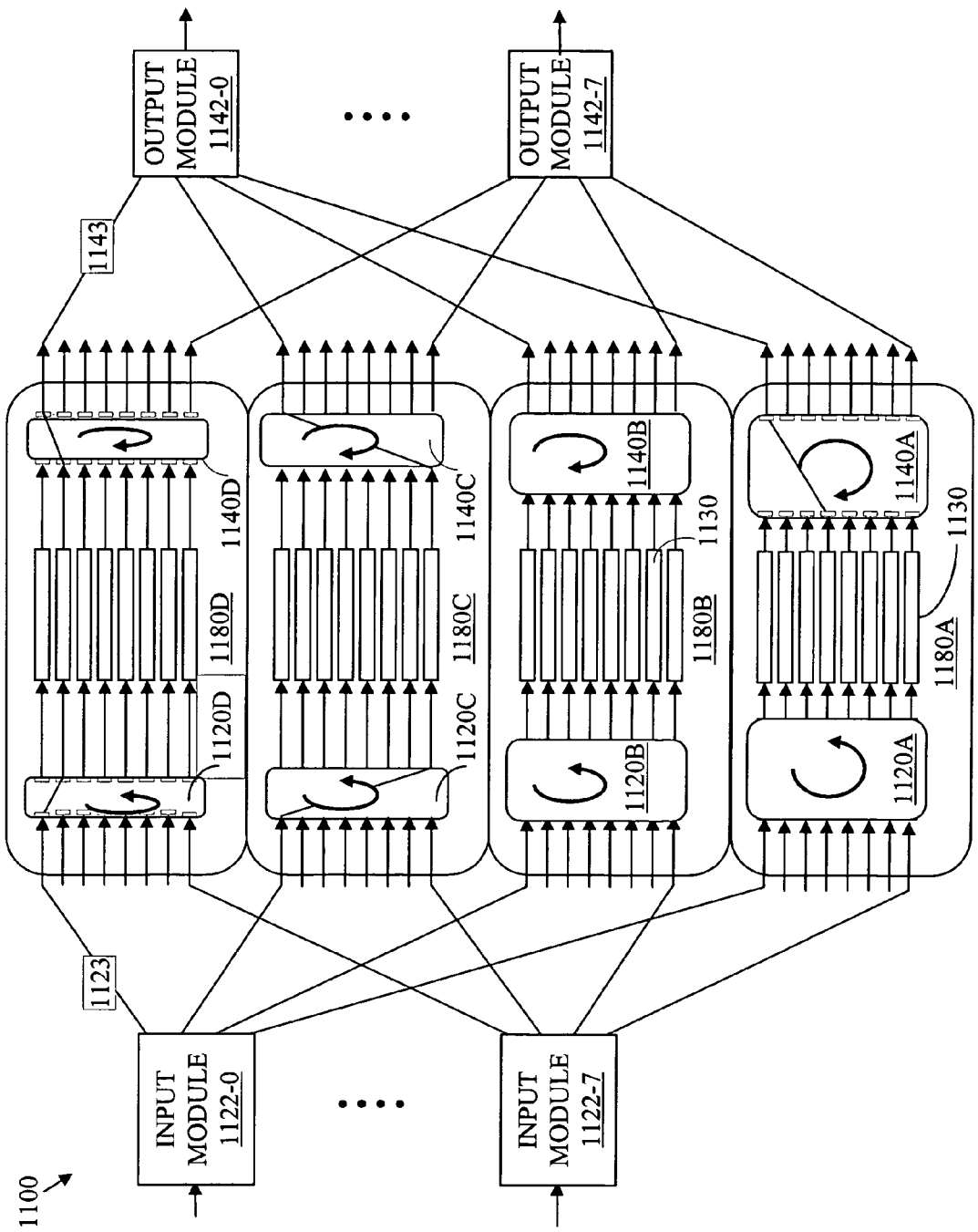
FIG. 11 illustrates a multi-speed rotating-access switch having four transit planes where the rotators of different transit planes may have rotation cycles of different durations, in accordance with an embodiment of the present invention.

FIG. 11 illustrates an exemplary multi-speed rotating-access switch 1100 in which four input rotators 1120A, 1120B, 1120C, and 1120D (referenced individually or collectively as 1120) operate at different rotation speeds and each of four output rotators 1140A, 1140B, 1140C, and 1140D (referenced individually or collectively as 1140) rotates in the opposite direction but at the same speed of a corresponding input rotator 1120. In this example, rotator pairs {1120A/1140A}, {1120B/1140B}, {1120C/1140C}, and {1120D/1140D} have increasing rotation speeds. Preferably, the rotation speeds may bear rational relationship to each other. For example, the rotation speeds may have the ratio 1:4:16:128 (hence the phase durations have the ratio 128:32:8:1). The exemplary multi-speed rotating-access switch 1100 comprises eight input modules 1122-0, . . . , 1122-7 (collectively or individually 1122), eight output modules 1142-0, . . . , 1142-7 (collectively or individually 1142) and four rotator space-switch planes 1180A, 1180B, 1180C, 1180D (collectively or individually 1180). Module controllers associated with the input/output modules, and a master controller for the entire switch 1100, have been omitted from FIG. 10 to simplify the illustration. Each rotator space-switch plane 1180 comprises a bank of transit memory devices 1130, an input rotator 1120 and an output rotator 1140. Within each rotator space-switch plane 1180, each input rotator 1120 cyclically connects eight input channels 1123 received from the eight input switch modules 1122 to the transit memory devices 1130 and each output rotator 1140 cyclically connects the transit memory devices 1130 to eight output channels 1143, each channel 1143 leading to one of the output switch modules 1142. The input rotators 1120 and the output rotators 1140 may have the same number of rotation phases per rotation cycle.

Data segments are written in the transit memory devices 1130 through an input rotator 1120 and read from the transit memory devices 1130 through an output rotator 1140 at interleaved time intervals. The sum of the write-interval and read-interval per rotation phase is constant for a given rotator space-switch plane 1180 but the duration of a read-interval and a write interval may differ.

Figure 12:
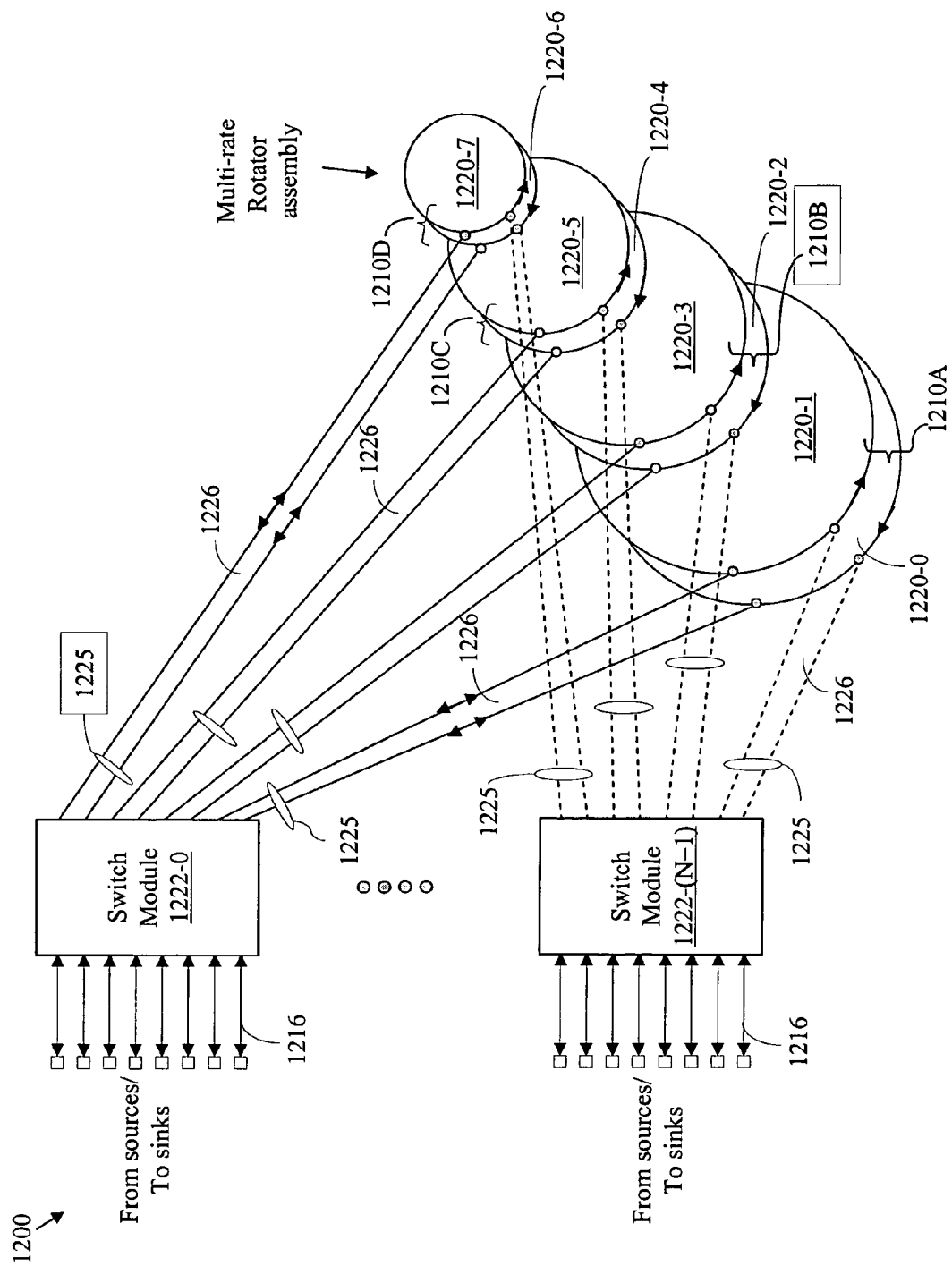
FIG. 12 illustrates a multi-speed circulating switch comprising a plurality of switch modules interconnected by four complementary rotator pairs having unequal rotation speeds, in accordance with an embodiment of the present invention.

FIG. 12 illustrates a rotorswitch 1200 where the rotor comprises four rotator pairs 1210A, 1210B, 1210C, and 1210D, referenced individually or collectively as 1210, which may rotate at different speeds. The rotator pairs 1210 interconnect a number N of multi-port common memory switch modules 1222-0, . . . , 1222-(N−1), referenced collectively or individually as 1222. Each rotator pair includes complementary rotators rotating in opposite directions and having rotation cycles of the same duration. Rotator pair 1210A includes two rotators 1220-0 and 1220-1, rotator pair 1210B includes two rotators 1220-2 and 1220-3, rotator pair 1210C includes two rotators 1220-4 and 1220-5, and rotator pair 1210D includes two rotators 1220-6 and 1220-7. The rotation cycle of each rotator pair preferably includes the same number of rotation phases for each rotator. However, the duration of the rotation phases may differ significantly among rotator pairs; thus the durations of the rotation cycles of rotators 1220-0, 1220-2, 1220-4, and 1220-6 may differ significantly. Preferably, the rotation speeds may bear rational relationship to each other as described above for the multi-speed rotating access switch of FIG. 11. Each rotator 1220 may be programmable to set and change its rotation speed.

Thus, rotators 1220 of a complementary rotator pair 1210 have different rotation directions but equal rotation speeds while rotators 1220 belonging to different complementary pairs 1210 may have different rotation speeds. In the example of FIG. 12, the rotators of complementary pairs 1210A, 1210B, 1210C, and 1210D have different rotation speeds, with the "diameter" of the circle representing a rotator 1220 being indicative of the duration of the rotation cycle of the rotator. Thus, each of rotators 1220-0 and 1220-1 has the lowest rotation speed (largest rotation-cycle duration) and each of rotators 1220-6 and 1220-7 has the highest rotation speed (smallest rotation-cycle duration).

A set of external dual channels 1216 connects the switch modules 1222 to network links, or to data traffic sources and sinks, and a set of internal dual channels 1226 connects the switch modules 1222 to the rotators 1220. The set of internal dual channels 1226 may be organized into dual-channel pairs 1225, where one internal dual channel 1226 of a dual-channel pair 1225 connects to a clockwise rotator of a complementary pair of rotators 1220 and the other internal dual channel 1226 of the dual-channel pair 1225 connects to a counterclockwise rotator of the complementary pair of rotators 1220.

Data streams of widely varying flow rates ranging, for example, from a few kilobits per second per stream to a few gigabits per second per stream, are preferably transferred in data blocks having sizes commensurate with the flow rates. The purpose is twofold: to limit data-block formation time and to reduce scheduling effort as will be described below. A multi-speed circulating switch according to the present invention realizes the above objective. Data received from data sources is organized in data blocks where the size of a data block is a function of the speed of the rotator-pair selected to transfer the data block. The size of a data block does not exceed a value determined as the product of the designated flow rate from a selected outbound port of a switch module to a rotator multiplied by the duration of the rotation phase associated with the rotator.

At each switch module 1222, during each rotation phase, there is one memory access interval for each ingress port for receiving data from a network link or subtending data traffic sources and there is one memory access interval for each outbound port for transmitting data through one of the rotators 1220. Likewise, there is one memory access interval for each egress port for transmitting data to a network link or subtending traffic sinks and there is one memory access interval for each inbound port for receiving data through one of the rotators 1220. The transit delay from a first switch module 1222 to a second switch module 1222 through any intermediate switch module is the same for a specific forward and terminating pair of rotators 1220. Naturally, the mean transit delay decreases with increasing rotator speed. Thus data transferred through the slowest rotator pair 1210A encounter a mean transit delay that is higher than the mean transit delay if the second slowest rotator pair 1210B is used, and so on.

Each switch module 1222 is operable to: receive connection requests, each connection request indicating a destination switch module and a specified flow rate; determine an internal data-unit size, from among a plurality of predefined data-unit sizes, according to the specified flow rate; and communicate the specified flow rate and internal data-unit size to the master controller.

Data-Memory Organization

Figure 13:
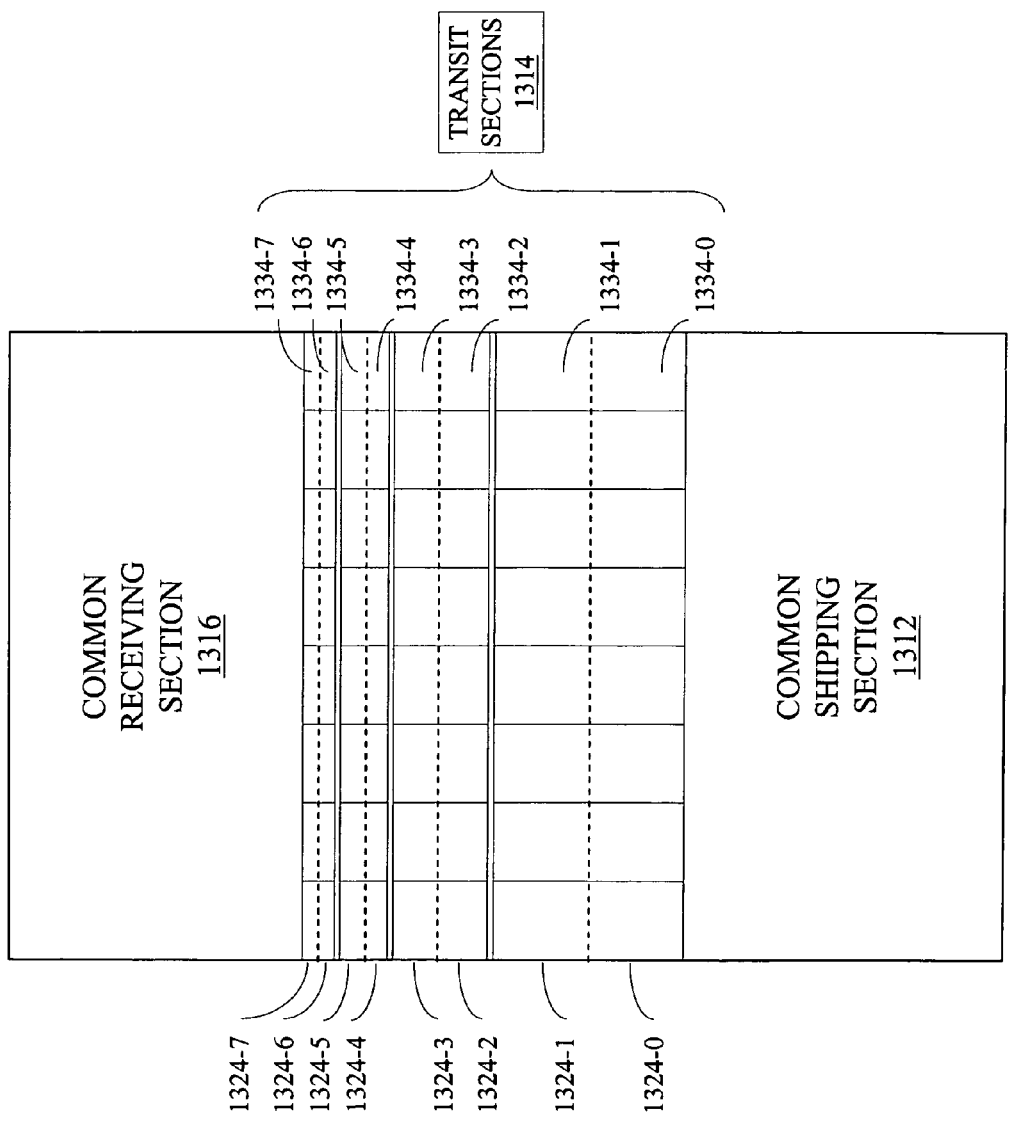
FIG. 13 illustrates an organization of a common memory used in a switch module in the multi-speed circulating switch of FIG. 12, in accordance with an embodiment of the present invention.

As in circulating switch 600 of FIG. 6, the common memory of each switch module 1222 is preferably partitioned logically into three sections as illustrated in FIG. 13 which illustrates a logical structure of the common memory of a switch module 1222 in a circulating switch 1200 having four rotator pairs 1210 each rotator pair having two rotators 1220 of the same speed (and rotating in opposite directions). The common memory is logically divided into a common shipping section 1312, which contains data segments received from all ingress ports, a block 1314 of eight transit sections 1324-0 to 1324-7 (referenced individually or collectively as 1324), each transit section 1324 corresponding to a rotator 1220, and a common receiving section 1316 containing data segments received from all inbound ports. Recall that the input ports of a switch module 1222 include ingress ports, receiving from traffic sources, and inbound ports receiving from other switch modules 1222 through the rotators 1220. The data in the receiving section may be arranged in a single queue, or may be sorted according to some criterion such as the origin switch module, service priority, or some other data stream identifier.

To facilitate the process of scheduling the transfer of the data segments across the rotators 1220, each transit section 1324 is slotted into a number of memory divisions (memory slots) 1334 at least equal to the number of switch modules 1222, or to the number of switch modules 1222 minus one because a switch module need not transmit data to itself through a rotator 1220, with each memory slot 1334 corresponding to one of the switch modules 1222. During each rotation phase, in a rotorswitch 1200 having more than four switch modules, a switch module 1222 may transmit data to at most four different switch modules 1222, and may receive data from at most four different switch modules 1222, through the four rotators. Each transit section 1324 includes memory divisions 1334 of equal sizes. However, unlike the common-memory organization of FIG. 7, the memory divisions of transit sections 1324 corresponding to different complementary rotator pairs may be of different sizes.

Each memory division 1334 can hold a predefined number of data segments. The size of a memory division 1334 in a transit section 1324 at least equals the size of a data block transferred during a rotation phase of the corresponding rotator. In FIG. 13, the memory divisions of the transit sections 1324-0 to 1324-7 are respectively identified as 1334-0 to 1334-7, with transit sections of the same rotator pair 1210 having the same size. Thus, with the rotation speeds of rotator-pairs 1210A, 1210B, 1210C, 1210D having the ratio 1:2:4:16, for example, the size of a memory division 1334-0 would be sufficient to store 16 data segments, the size of a memory division 1334-2 would be sufficient to store 8 data segments, the size of a memory division 1334-4 would be sufficient to store 4 data segments, and the size of a memory division 1334-6 would be sufficient to store one data segment.

The data segments in the shipping section 1312 of a given switch module 1222 may be transferred across a rotator 1220 to either a transit section 1324 or the receiving section 1316 of another switch module 1222. The transit section 1324 of the given switch module 1222 contains data segments to be transferred to a receiving section of another switch module 1222 through the rotator 1220. The receiving section 1316 of the given switch module 1222 contains data segments directed to a network link or to data traffic sinks associated with the given switch module. The data segments in the shipping section 1312 are preferably sorted according to destination switch modules 1222 to facilitate scheduling and flow-rate control.

Figure 14:
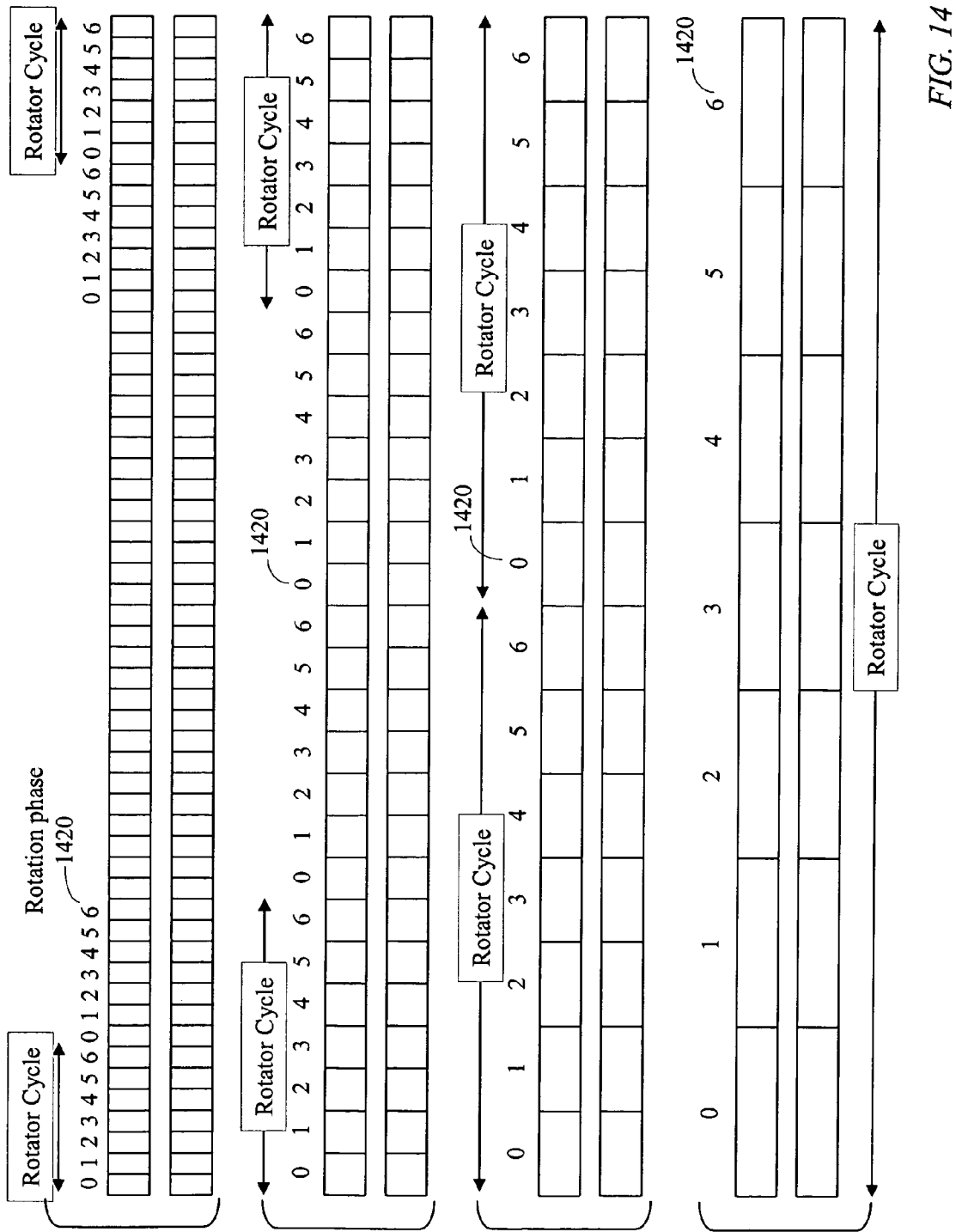
FIG. 14 illustrates transit sections in a switch module in the multi-speed circulating switch of FIG. 12 including two sections corresponding to each complementary rotator pair, in accordance with an embodiment of the present invention.

FIG. 14 illustrates exemplary rotation cycles for the four rotator pairs 1210 of a switch 1200 of FIG. 12 having eight switch modules 1222. For each rotator 1220, in this example, the number of rotation phases 1420 per rotation cycle is selected to be seven because a switch module 1222 need not connect to itself through a rotator 1220. The rotation phases are indicated in FIG. 14 by the indices 0 to 6. In the illustrated example, the durations of the rotation cycle of rotator pairs 1210A, 1210B, 1210C, and 1210D have the ratio 8:4:2:1. Thus, during a rotation cycle of the slowest rotator, 1220-0 or 1220-1, each switch module 1222 accesses each of the seven other switch modules 1222 once through each rotator 1220-0 or 1220-1, twice through each rotator 1220-2 or 1220-3, four time through rotator 1220-4 or 1220-5, and eight times through each rotator 1220-6 or 1220-7.

Each switch module 1222 may be constructed as a common-memory switch having a number of input ports and output ports cyclically and successively accessing the common memory. An input port may write a data segment during its memory-access interval and an output port may read a data segment during its memory-access interval. The written data segments may be logically sorted according to their designated output ports. The input ports include outer input ports for receiving data from traffic sources or from external switching nodes and inner input ports for receiving data from other switch modules through the rotators. The output ports include outer output ports for transmitting data to data sinks or to a network link leading to an external switching node and inner output ports for transmitting data to other switch modules through the rotators 1220.

Contention-Free Switch Module

A simple contention-free switch module may be configured as a common-memory switch. A common-memory switch relies on massive data parallelism to enable high-speed data storage and retrieval. Data is stored in a common-memory comprising parallel memory devices which are identically addressed and different portions of a data segment are stored in corresponding addresses in the parallel memory devices constituting the common memory. During an access cycle, each input port of a plurality of input ports accesses the common memory to write a data segment and each output port of a plurality of output ports accesses the common memory to read a data segment. In a common-memory switch, there is no internal contention and each stored data segment is guaranteed a path to its desired output port. Data loss may occur if the memory is fully occupied. However, with proper selection of the memory size, the probability of full occupancy of the common memory would be infinitesimally small.

The access capacity of a wide-memory switch module is determined by the ratio of the width of the memory to the memory access time. For example, with a memory width of 1024 bits and access time (write and read) of 20 nanosecond, the capacity of the switch module is approximately 50 Gigabits per second (Gb/s). To realize a capacity of 200 Gb/s with the same memory speed, the required width would be 4 kilobits.

Figure 16:
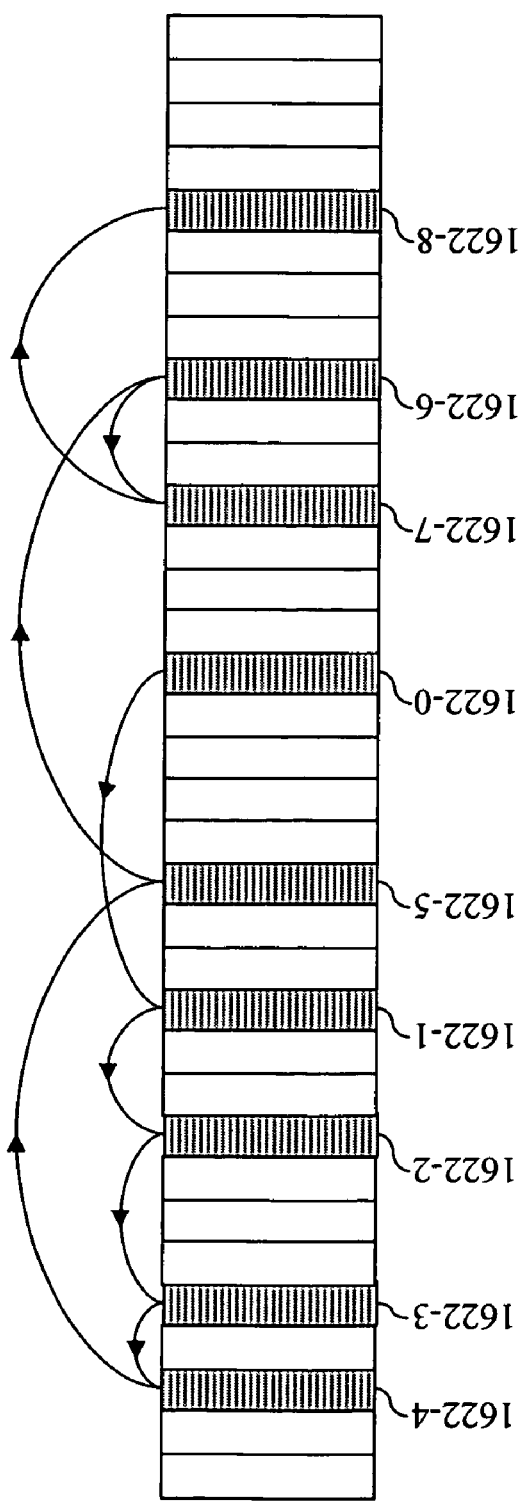
FIG. 16 illustrates linkage of data blocks belonging to a common data stream in the common memory of FIG. 15.

FIG. 15 illustrates the formation of data segments in a common-memory switch module 1222 having six input ports and six output ports. The figure illustrates the aggregation of data slices received from the six input ports into data segments with each data segment containing six data slices, which may include null data slices. The input ports of the switch module are labeled 0, 1, 2, 3, 4, and 5. The input ports take turns in accessing the common memory where each input port gains exclusive access during a corresponding time slot in a time frame of six time slots (i.e., a common-memory cycle of six time slots). Data received at each input port is structured into data slices and the input ports start to form data segments at successive time slots. Thus, an input port p, $0 \leq p < 6$ starts to form data segments at time slot (T+p), where T is an integer multiple of 6. The data slices formed at input port p during time slots (T+p) to (T+p+5) are labeled p-0 to p-5. Thus, port 0 forms data slices 0-0, 0-1, 0-2, 0-3, 0-4, and 0-5 during each common-memory cycle of 6 time slots, port 1 forms data slices 1-0, 1-1, 1-2, 1-3, 1-4, and 1-5 during each common memory cycle of six time slots, and so on. During time slot (T+p+6), input port p writes a data segment of six data slices, possibly including null data slices, at an unoccupied address in the common memory. As illustrated, data slices 0-0, 0-1, 0-2, 0-3, 0-4, and 0-5 are written simultaneously in the common memory during time slots 0, 6, 12, etc. Although FIG. 15 illustrates a common-memory switch having six input ports, it is understood that the number of input ports may vary according to the desired capacity. The data segments may be logically sorted according to their destination output ports. This may be done conveniently by forming a linked list for each output port as illustrated in FIG. 16 which indicates nine data segments destined to a given output port and stored in memory addresses 1622-0 to 1622-8 with the data segment written at address 1622-0 being the earliest data segment entered in the common memory and waiting for the given output port, and a pointer associated with address 1622-$j$, $0 \leq j < 8$ pointing to an address 1622-($j$+1) of a subsequent data segment in the memory. Naturally, a data segment is not written in memory if it contains only null data. It is noted that the linked-list structure is suitable for the shipping section (712 or 1312) and receiving section (716 or 1316) of the common memory of a switch module 622 or 1222 (FIGS. 6 and 12). Each transit section, 724 or 1324, contains a predefined maximum number of data segments per memory division (FIGS. 7 and 13) and is preferably assigned fixed memory addresses.

Figure 17:
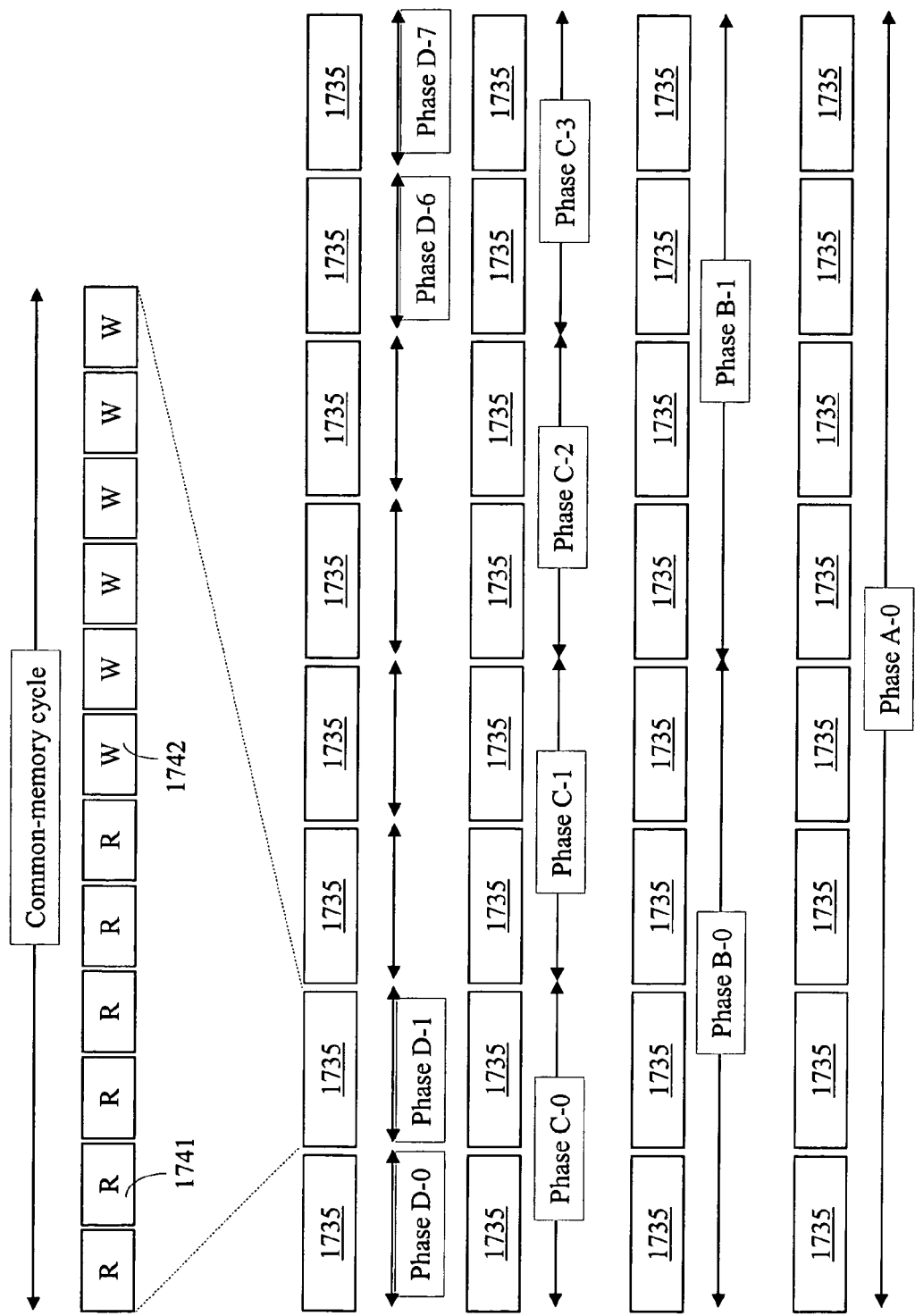
FIG. 17 illustrates concurrent rotation phases in the multi-speed circulating switch of FIG. 12 having multi-speed rotators, in accordance with an embodiment of the present invention.

FIG. 17 illustrates data transfer from the common memory of a switch module 1222 (FIG. 12) to four output ports, of the switch module, that connect to four rotators 1220 of different speeds, the speed ratios being 1:2:4:8. The figure illustrates one rotation phase of the slowest rotator 1220-0 (or 1220-1), two rotation phases of rotator 1220-2 (or 1220-3), four rotation phases of rotator 1220-4 (or 1220-5), and eight rotation phases of the fastest rotator 1220-6 (or 1220-7). The rotation phases of rotators 1220-0, 1220-2, 1220-4, and 1220-6 are respectively labeled as {phase A-0}, {phase B-0, phase B-1}, {phase-C-0, phase-C-1, phase-C-2, phase-C-3}, and {phase D-0, phase D-1, . . . , phase D-6, phase D-7}. During a rotation phase of the slowest rotator, a data block of 8 data segments 1735 may be transferred to a single receiving switch module 1222, two data blocks each comprising four data segments 1735 may be transferred to two consecutive switch modules 1222, four data blocks, each comprising two data segments 1735 may be transferred to four consecutive switch modules 1222, and one data segment 1735 may be transferred to each of eight consecutive switch modules 1222. If the rotorswitch 1200 has less than 9 switch modules 1222, data segments may be transferred from a switch module to another through the fastest rotator more than once during a rotation phase of the slowest rotator.

A data segment 1735 sent from a first switch module 1222 to a second switch module 1222 may be stored in the receiving section or a transit section of the second switch module. If the data segment is destined to a traffic sink subtending to the second switch module, it is stored in the receiving section of the second switch module. Otherwise, if the data segment is destined to another switch module, it is stored in the transit section of the second switch module.

The input ports of a common-memory switch 1222 include ingress ports and inbound ports as described earlier, and the output ports include egress ports and outbound ports. During a common-memory cycle, a data segment from each ingress port and a data segment from each inbound port may be written in the common memory of a switch module 1222. Also, a data segment to each egress port and a data segment to each outbound port may be read from the common memory. In a switch module 1222 having two ingress ports, four inbound ports, two egress ports, and four outbound ports, a common-memory cycle would include six read intervals 1741 and six write intervals 1742, labeled in FIG. 17 as 'R' and 'W', respectively.

Preferably, data blocks transmitted through a particular rotator are formed at the outbound port of each switch module 1222 connecting to the particular rotator. During a rotation phase of the particular rotator 1220, the outbound port reads a data block comprising at least one data segment from the common-memory and forms data blocks each of a size corresponding to the duration of the rotation phase of the particular rotator.

Connectivity

Figure 18:
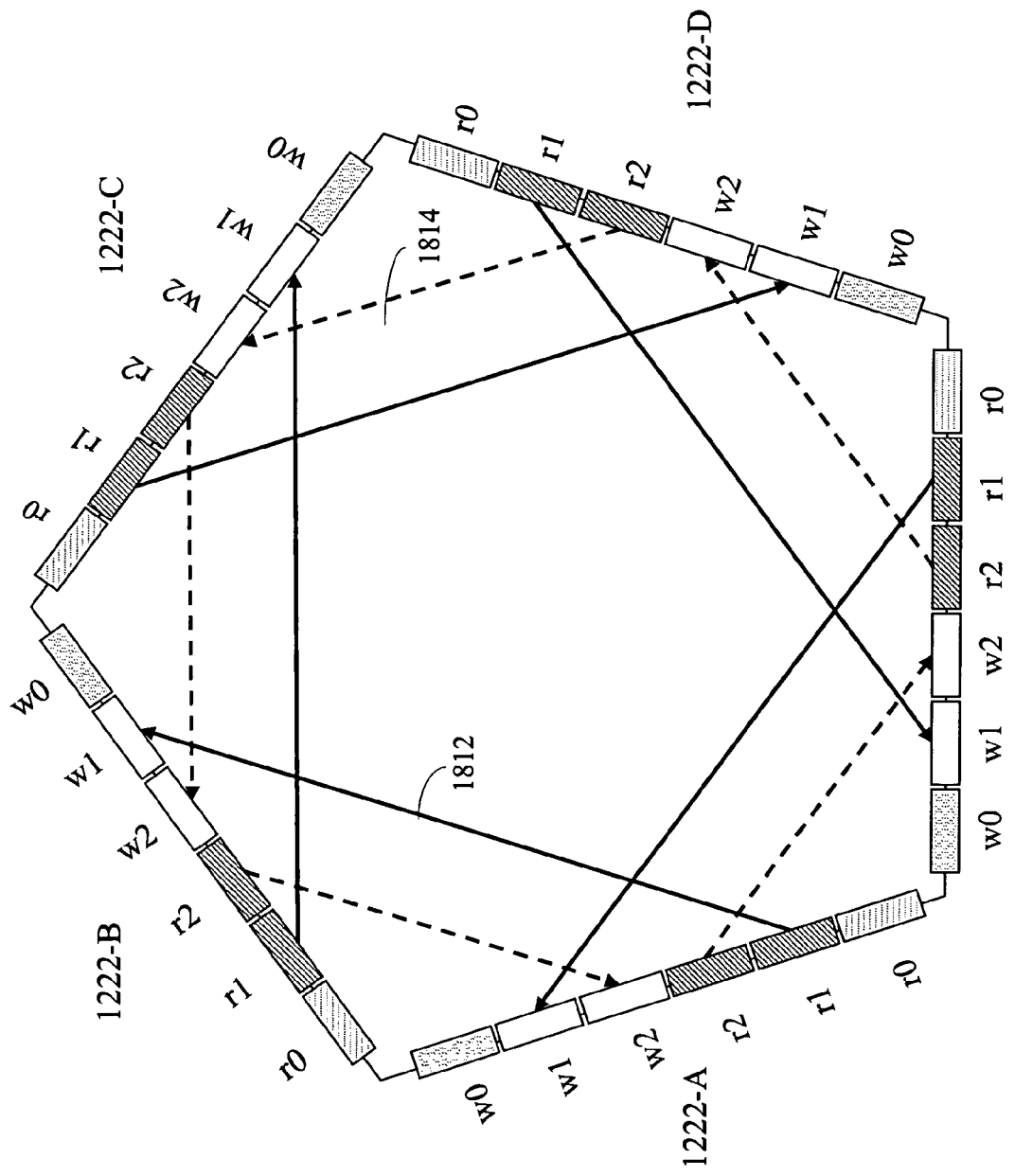
FIG. 18 illustrates switch-module connectivity during a single rotation phase in a circulating switch of the type illustrated in FIG. 12 comprising five switch modules and one complementary rotator pair, in accordance with an embodiment of the present invention.
Figure 19:
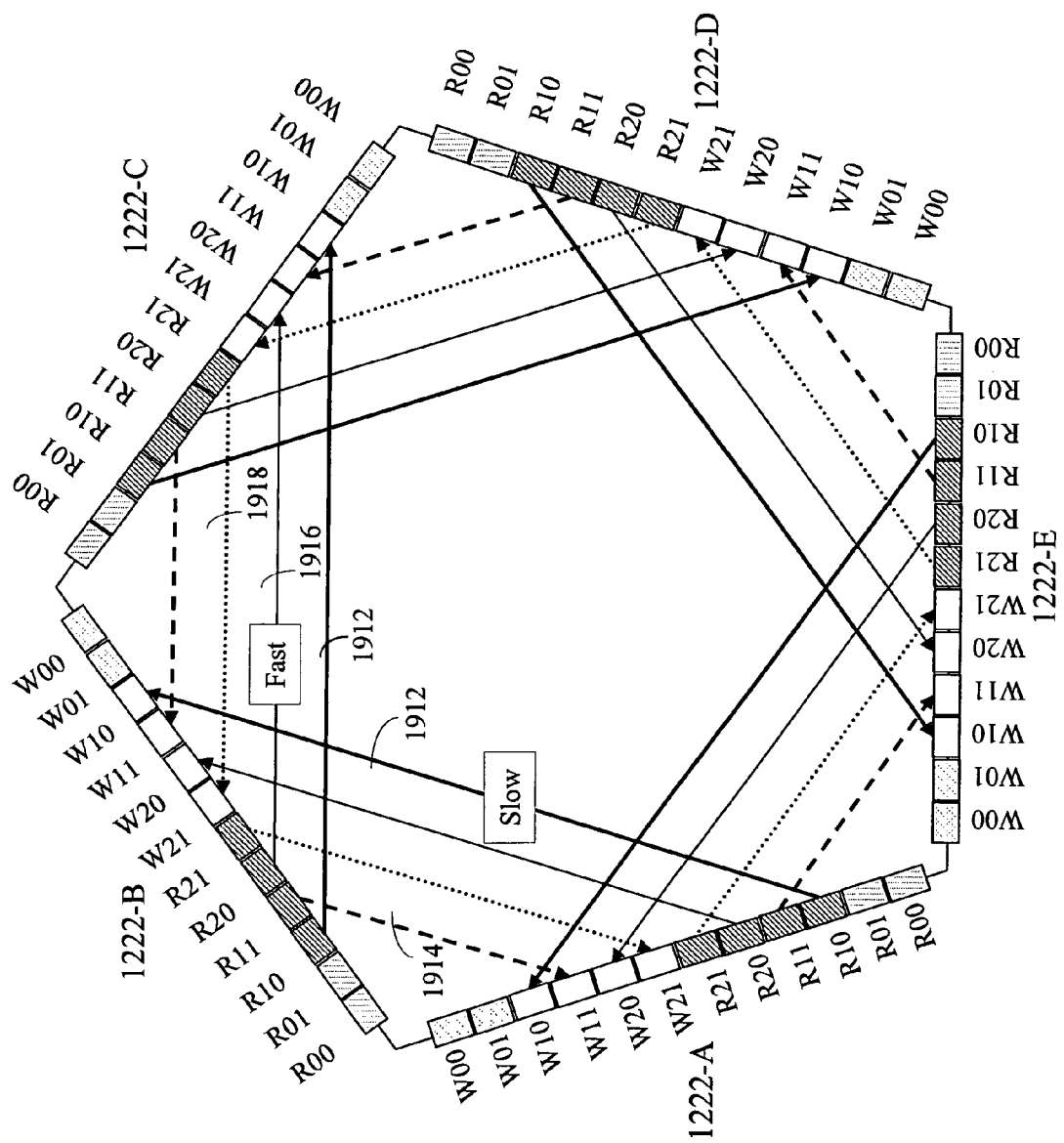
FIG. 19 illustrates switch-module connectivity in a multi-speed circulating switch of the type illustrated in FIG. 12 comprising five switch modules and two complementary rotator pair of different speeds during a rotation phase of the faster complementary rotator pair, in accordance with an embodiment of the present invention.
Figure 20:
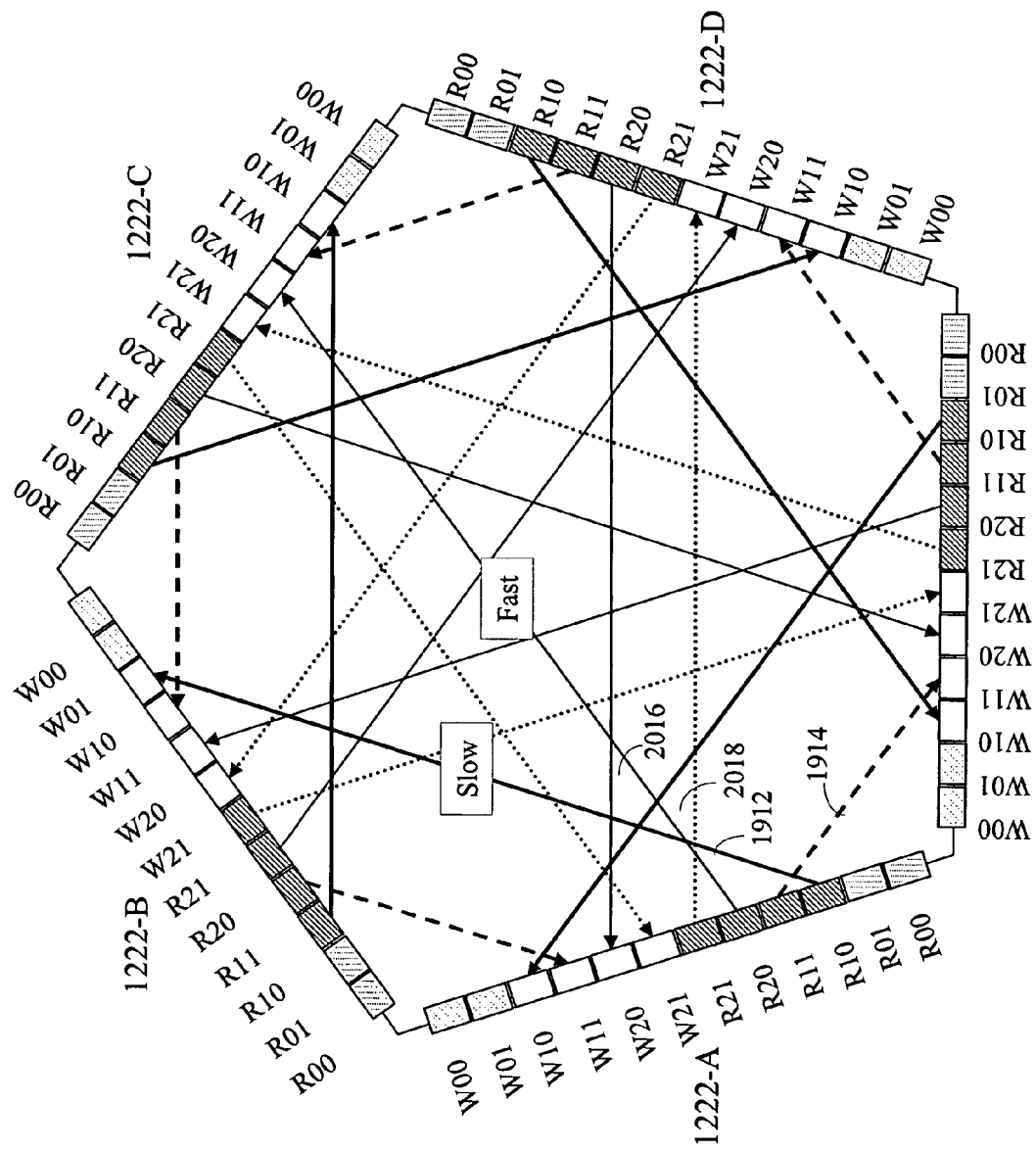
FIGS. 20, 21, and 22 illustrate the switch-module connectivity in the multi-speed circulating switch of FIG. 12 during three subsequent rotation phases of the faster complementary rotator pair, in accordance with an embodiment of the present invention.
Figure 21:
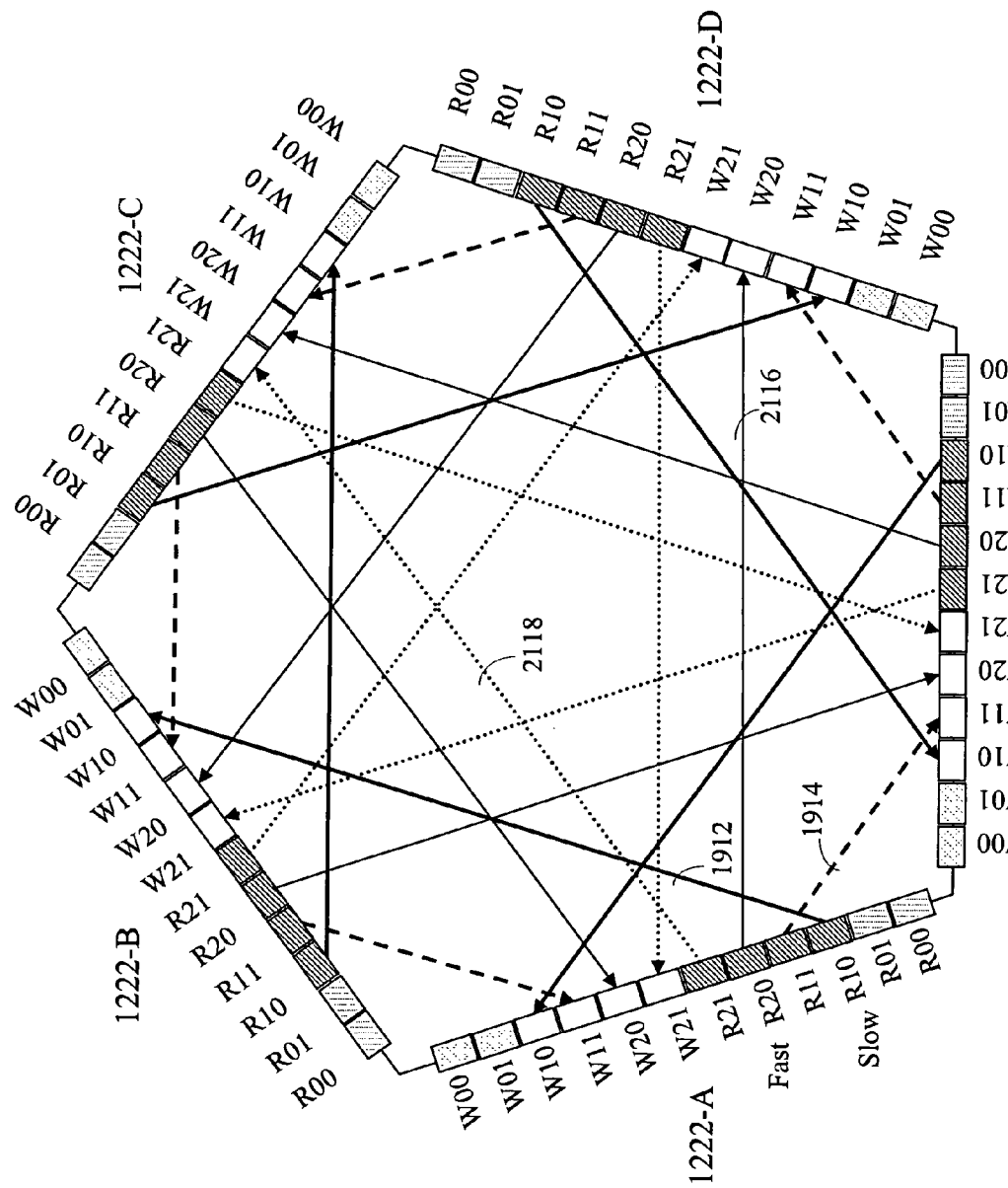
Figure 22:
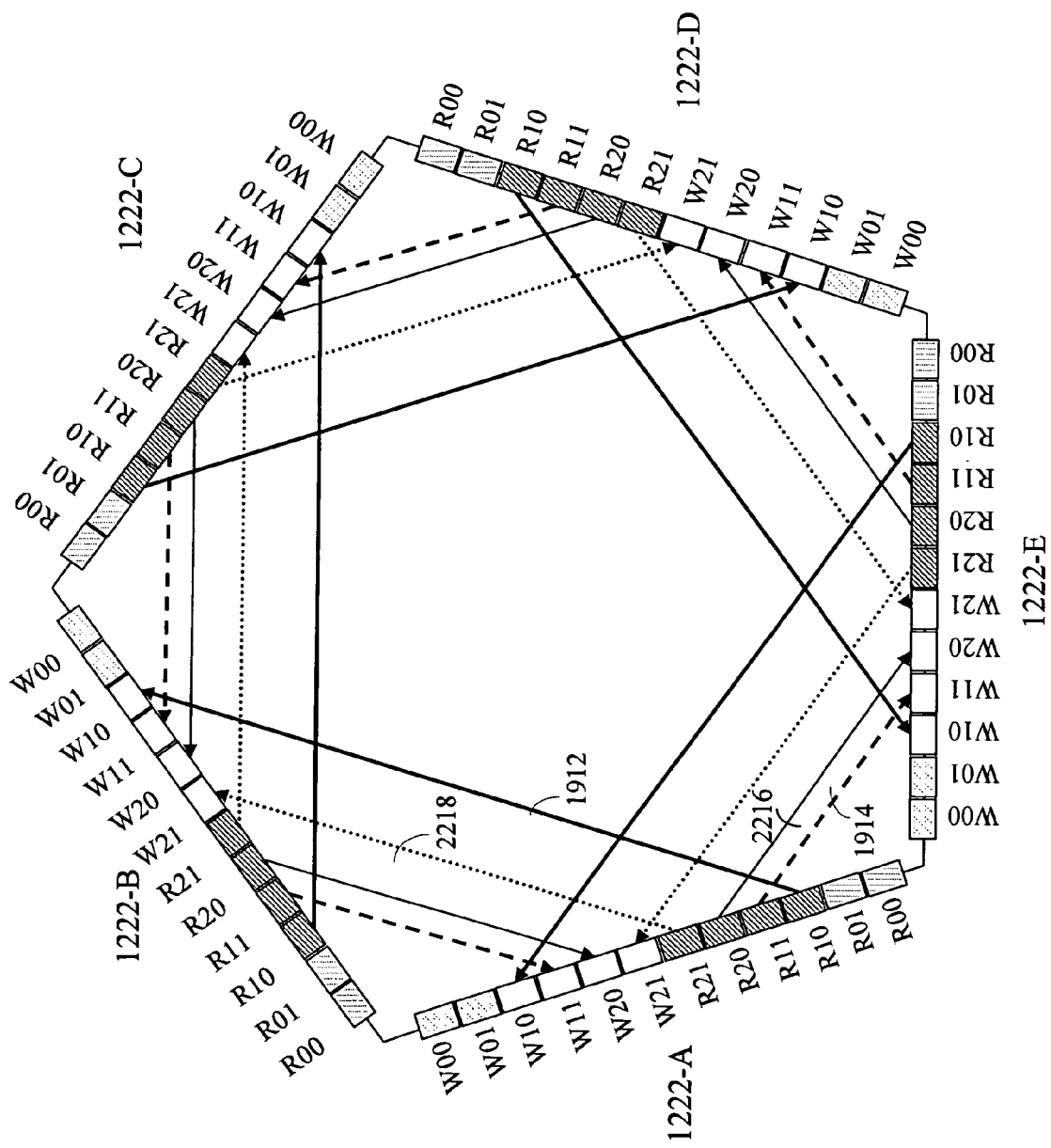

Consider a rotorswitch 1200 having five switch modules 1222-A, 1222-B, 1222-C, 1222-D, and 1222-E, and one complementary rotator pair. Each switch module 1222 has one outer input port for receiving data from data sources or a network link, one outer output port for transmitting data to a network link or data sinks, two inner output ports for transmitting data from the switch module 1222 to the other switch modules 1222 through the clockwise rotator and the counter clockwise rotator (the complementary rotator pair), and two inner input ports for receiving data from other switch modules 1222 through the clockwise rotator and counterclockwise rotator. FIG. 18 illustrates the interconnection of the five switch modules through the clockwise and counterclockwise rotators during a single rotation phase where switch modules 1222-A, 1222-B, 1222-C, 1222-D, and 1222-E connect to switch modules 1222-B, 1222-C, 1222-D, 1222-E, and 1222-A, respectively, through the clockwise rotator and connect to switch modules 1222-E, 1222-A, 1222-B, 1222-C, and 1222-D, respectively, through the counterclockwise rotator. The switch-module common-memory cycle duration is equal to or less than the duration of a rotation phase and includes three write-intervals, labeled as w0, w1, and w2, and three read-intervals, labeled as r0, r1, and r2. During read interval r1 a data segment may be read from switch module 1222-A to be written, through the clockwise rotator, in switch module 1222-B at write interval w1. Concurrently, during read interval r1, data segments may be read from switch modules 1222-B, 1222-C, 1222-D, and 1222-E to be written, through the clockwise rotator during write interval w1, in switch modules 1222-C, 1222-D, 1222-E, and 1222-A, respectively, as indicated by solid lines 1812. During read interval r2 a data segment may be read from switch module 1222-A to be written, through the counterclockwise rotator, in switch module 1222-E at write interval w2. Concurrently, during read interval r2, data segments may be read from switch modules 1222-B, 1222-C, 1222-D, and 1222-E to be written, through the counterclockwise rotator, during write interval w2, in switch modules 1222-A, 1222-B, 1222-C, and 1222-D, respectively as indicated by dashed lines 1814. A data segment traversing a rotator may be held in a register for a short period due to the non-coincidence of corresponding read and write intervals within a rotation phase.

During read interval r1 of a subsequent rotation phase, data segments may be read from switch modules 1222-A, 1222-B, 1222-C, 1222-D, and 1222-E to be written, during write interval w1, in switch modules 1222-C, 1222-D, 1222-E, 1222-A, and 1222-B, respectively, through the clockwise rotator. During read interval r2 of the subsequent rotation phase, data segments may be read from switch modules 1222-A, 1222-B, 1222-C, 1222-D, and 1222-E to be written, during write interval w2, in switch modules 1222-D, 1222-E, 1222-A, 1222-B and 1222-C, respectively, through the counterclockwise rotator.

During write interval w0, a data segment, from a network link or from data sources, may be written in the shipping section 1312 of each switch module 1122 and, during read interval r0, a data segment is read from the receiving section of each switch module to be transmitted to a data sink or to an external node along a network link.

FIGS. 19, 20, 21, and 22 relate to a rotorswitch 1200 having five switch modules 1222-A, 1222-B, 1222-C, 1222-D, and 1222-E, and two complementary rotator pairs of different rotator speeds, with the first complementary rotator pair being the slower rotator pair. A rotation phase of either rotator in the first complementary rotator pair includes four rotation phases of either rotator in the second complementary rotator pair. The figures illustrate the change in the internal temporal connections during four consecutive rotation phases of the faster complementary rotator pair. Each switch module 1222 has one outer input port for receiving data from data sources or a network link, one outer output port for transmitting data to a network link or data sinks, four inner output ports for transmitting data from the switch module 1222 to the other switch modules 1222 through the two complementary rotator pairs, and four inner input ports for receiving data from other switch modules 1222 through the complementary rotator pairs.

The common-memory cycle for a switch module 1222 then includes six write-intervals, labeled, W00, W01, W10, W11, W20, and W21 and six read-intervals, labeled R00, R01, R10, R11, R20, and R21. During each of intervals W00 and W01, a data segment from a network link or from data sources may be written in the common memory of a switch module. During each of intervals R00 and R01, a data segment may be read from the common memory of a switch module and transmitted to data sinks supported by the switch module or transmitted over a network link to an external switching node. During each of intervals R10 and R11, a data segment may be read from a switch module to be written in the common memory of another switch module during intervals W10 and W11, respectively, through the first complementary rotator pair. During each of intervals R20 and R21, a data segment may be read from a switch module to be written in the common memory of another switch module during intervals W20 and W21, respectively, through the second complementary rotator pair. As in the case of FIG. 18, data segments traversing a rotator may be held in registers for a short period due to the non-coincidence of corresponding read and write intervals within a rotation phase.

During each of the four rotation phases of the second complementary rotator pair, switch modules 1222-A, 1222-B, 1222-C, 1222-D, and 1222-E connect through the clockwise rotator of the first complementary rotator pair to switch modules 1222-B, 1222-C, 1222-D, 1222-E, and 1222-A, respectively, as indicated by the solid lines 1912 in FIGS. 19, 20, 21, and 22. Switch modules 1222-A, 1222-B, 1222-C, 1222-D, and 1222-E also connect through the counterclockwise rotator of the first complementary rotator pair to switch modules 1222-E, 1222-A, 1222-B, 1222-C, and 1222-D, respectively during each of the four rotation phases of the second complementary rotator pairs as illustrated by dashed lines 1914 in FIGS. 19, 20, 21, and 22. During the first phase of the second complementary rotator pair, the switch modules have the same connectivity through either of the two complementary rotator pairs, the only difference being that the connectivity through the first rotator pair takes place during intervals {R10, W10} and {R11, W11} while the connectivity through the second rotator pair take place during intervals {R20, W20} and {R21, W21}. The change of connectivity of the five switch modules 1222-A to 1222-E during four rotation phases of the second complementary rotator pair are indicated in FIGS. 19, 20, 21, and 22, with solid lines 1916, 2016, 2116, and 2216 indicating connectivity through the clockwise rotator and the dashed lines 1918, 2018, 2118, and 2218 indicating connectivity through the counterclockwise rotator of the second rotator pair.

Thus, if the duration of the rotation phase of the first complementary rotator pair is an integer multiple ν of the duration of the second complementary rotator pair, then the connectivity of the switch modules through the first complementary rotator pair remains unchanged during a rotation phase of the first complementary rotator pair while the connectivity of the switch modules 1222 through the second complementary rotator pair changes ν times. FIGS. 19 to 22 illustrate the interconnection of the five switch modules through the two rotator pairs, each having a clockwise and a counterclockwise rotator, where the rotation speed of each rotator in the first complementary rotator pair is four times the rotation speed of each rotator in the first rotator pair (ν=4).

Figure 23:
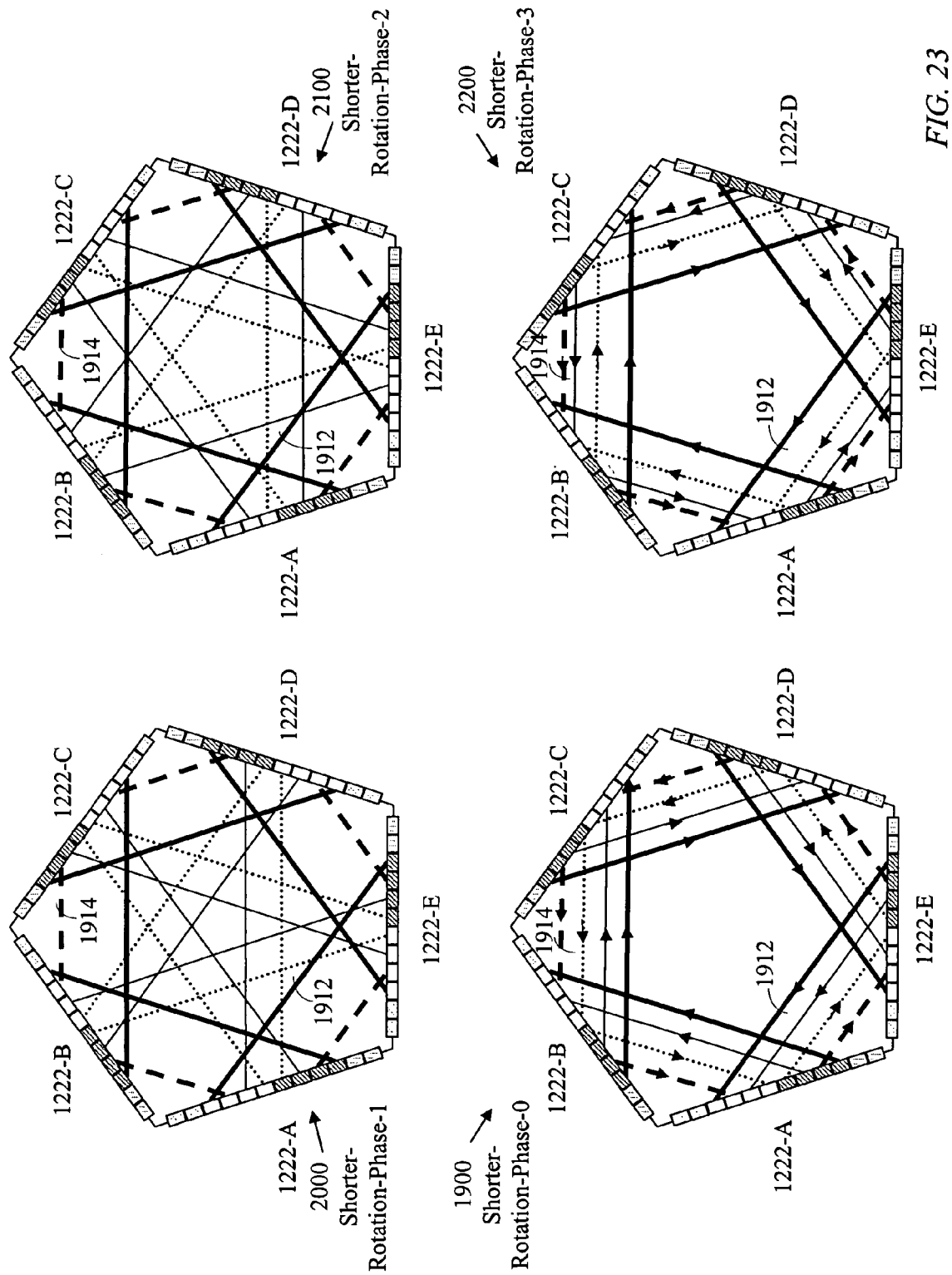
FIG. 23 further presents the change in switch-module connectivity as illustrated in FIGS. 19 to 22.

To further clarify the temporal connectivity change, the connectivity patterns of the switch modules through the two complementary rotator pairs, in the example of FIGS. 19 to 22, are distinctly identified during four consecutive rotation phases of the second rotator pair in FIG. 23. During a rotation phase of the slower complementary rotator pair, the interconnection of the five switch modules 1222-A to 1222-E through the second (faster) complementary rotator pair, illustrated by thin lines, changes four times while the interconnection through the slower complementary rotator-pair, illustrated by thick lines, remains unchanged.

FIGS. 24, 25, 26, and 27, described below, relate to a rotorswitch 1200 having six switch modules 1222-0, 1222-1, 1222-2, 1222-3, 1222-4, and 1222-5, which are referenced by the suffixes 0, 1, 2, 3, 4, and 5, for clarity of the figures.

Figure 24:
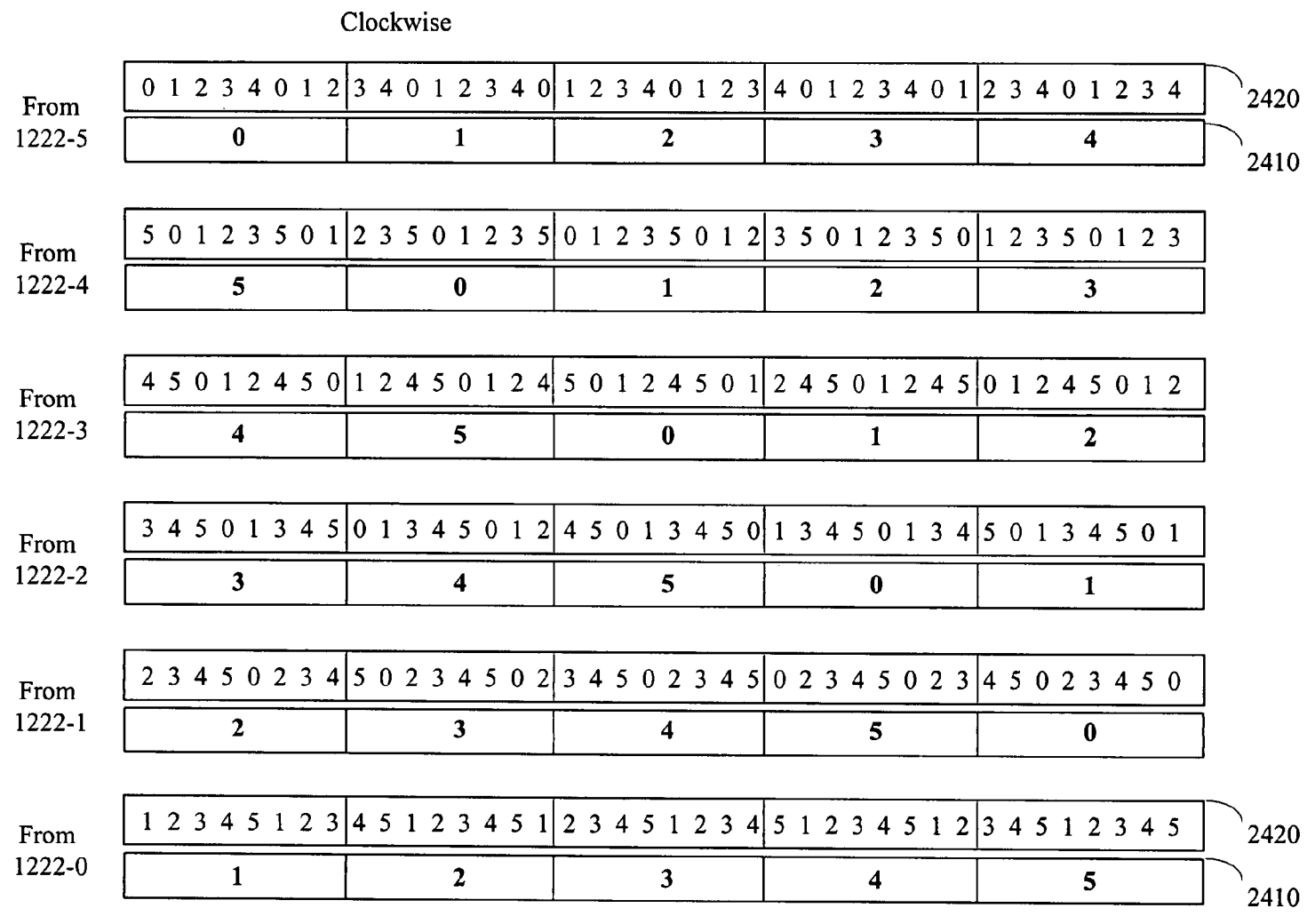

FIG. 24 illustrates the connectivity of a circulating switch 1200 having six switch modules 1222-0, 1222-1, 1222-2, 1222-3, 1222-4, and 1222-5, a first plurality of slow rotators, and a second plurality of faster rotators where the rotation phase of a slow rotator includes 8 rotation phases of any of the faster rotators. A switch module 1222 does not connect to itself through the rotators and, therefore, the rotation cycle is selected to include five rotation phases so that switch module 1222-0 cyclically connects, through a given clockwise rotator, to switch modules 1222-1, 1222-2, 1222-3, 1222-4, and 1222-5 during a rotation cycle of the given clockwise rotator. Likewise, switch module 1222-1 cyclically connects to switch modules 1222-2, 1222-3, 1222-4, 1222-5, and 1222-0 during a rotation cycle of the given clockwise rotator. Switch module 1222-0 cyclically connects, through a given counterclockwise rotator, to switch modules 1222-5, 1222-4, 1222-3, 1222-2, and 1222-1 during a rotation phase of the given counterclockwise rotator and switch module 1222-1 cyclically connects to switch modules 1222-0, 1222-5, 12224, 1222-3, and 1222-2 during a rotation phase of the given counterclockwise rotator.

Figure 25:
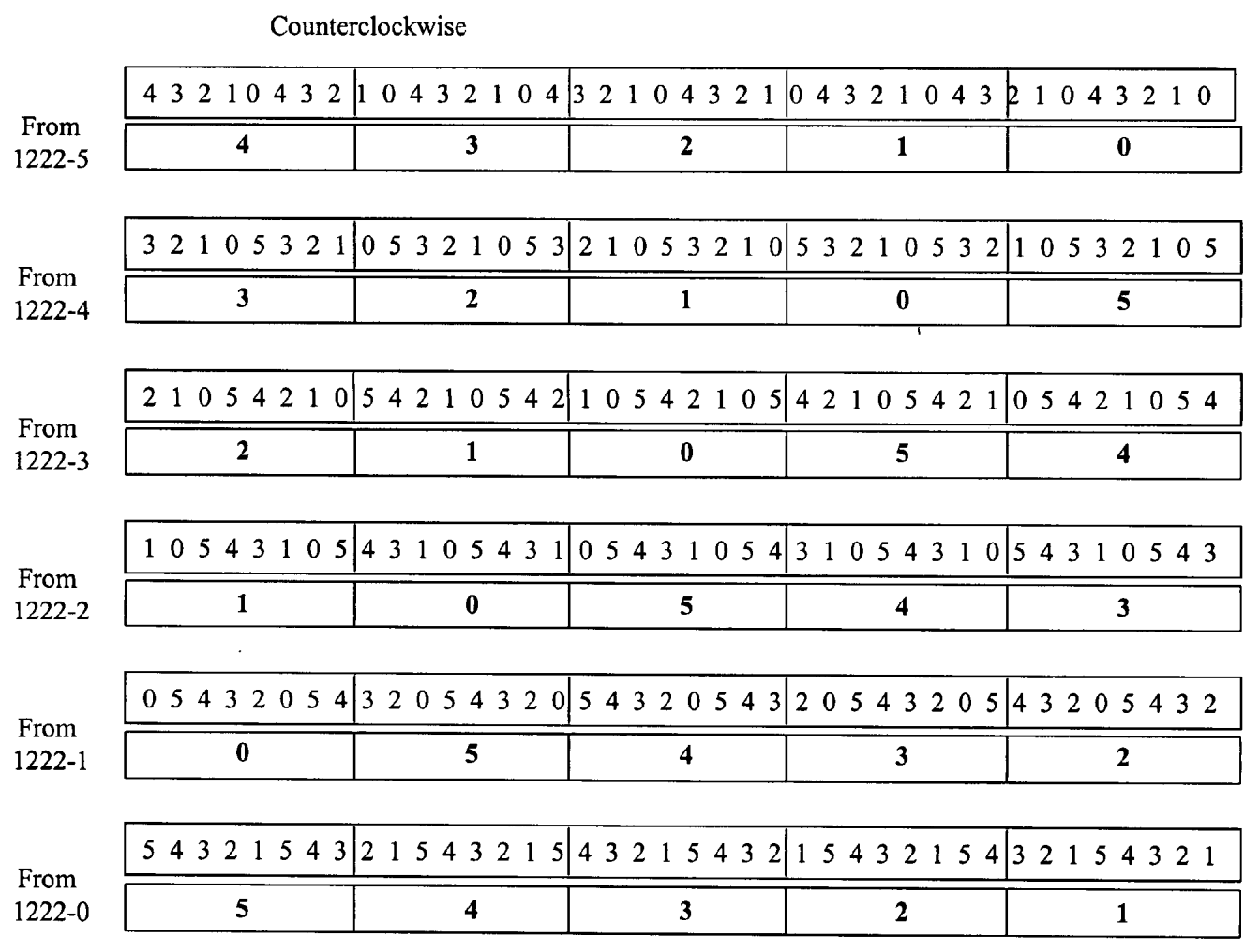

The speed ratio of the two rotator types is 8, and the connectivity of each of the six switch modules 1222-0, 1222-1, 1222-2, 1222-3, 1222-4, and 1222-5 to each other of the six switch module through a slow clockwise rotator and a fast clockwise rotator is illustrated in FIG. 24 over a period of time equal to the duration of the rotation cycle of the slow rotator. Arrays 2410 illustrate the connectivity through the slow clockwise rotator and arrays 2420 illustrate the connectivity through the fast clockwise rotator. Thus, during the first rotation phase of each rotation cycle of the slow rotator pair, switch module 1222-0 connect to switch module 1222-1 through the clockwise rotator of the slow rotator pair and to switch modules 1222-1, 1222-2, 1222-3, 1222-4, 1222-5, 1222-1, 1222-2, and 1222-3 through the clockwise rotator of the fast rotator pair. Similarly, during the first rotation phase of each rotation cycle of the slow rotator pair, switch module 1222-5 connect to switch module 1222-0 through the slow clockwise rotator and to switch modules 1222-0, 1222-1, 1222-2, 1222-3, 1222-4, 1222-0, 1222-1, and 1222-2 through the fast clockwise rotator. FIG. 25 illustrates the corresponding connectivity through the counterclockwise rotators of the slow and fast rotator pairs.

Figure 26:
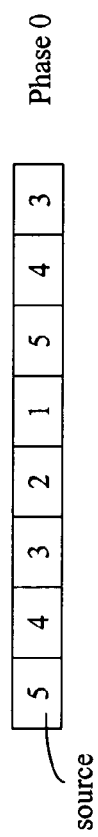
FIG. 26 illustrates the sequence of switch modules transmitting to a specific switch module, through four rotators of different speeds, in a multi-speed circulating switch of the type illustrated in FIG. 12 having six switch modules, in accordance with an embodiment of the present invention.

FIG. 26 illustrates the connectivity from different switch modules 1222 to switch module 1222-0 in the rotor switch 1200 considered in the example of FIGS. 24 and 25. The six switch modules are referenced by their suffixes 0, 1, 2, 3, 4, and 5. The rotation cycle of the slowest rotator includes eight rotation cycles of the faster rotator. During rotation phase 0 of the slowest clockwise rotator, destination switch module 1222-0 receives eight data segments, one from each of switch modules 1222-5, 1222-4, 1222-3, 1222-2, 1222-1, 1222-5, 1222-4, and 1222-3, respectively, through the fastest rotator. The sequence of switch modules transmitting to switch module 1222-0 during each of the remaining four rotation phases of the slowest clockwise rotator is also illustrated. As indicated, destination switch module 1222-0 receives data segments from switch modules {1222-2, 1222-1, 1222-5, 1222-4, 1222-3, 1222-2, 1222-1, and 1222-5}, {1222-4, 1222-3, 1222-2, 1222-1, 1222-5, 1222-4, 1222-3, and 1222-2}, {1222-1, 1222-5, 1222-4, 1222-3, 1222-2, 1222-1, 1222-5, and 1222-4}, {1222-3, 1222-2, 1222-1, 1222-5, 1222-4, 1222-3, 1222-2, and 1222-1}, respectively, during rotation phases 1 to 5 of the slowest clockwise rotator. The connectivity from switch modules {1222-1, . . . , 1222-5} to switch module 1222-0 through the faster counterclockwise rotator during a rotation phase of the slower counterclockwise rotator may be likewise determined.

Figure 27:
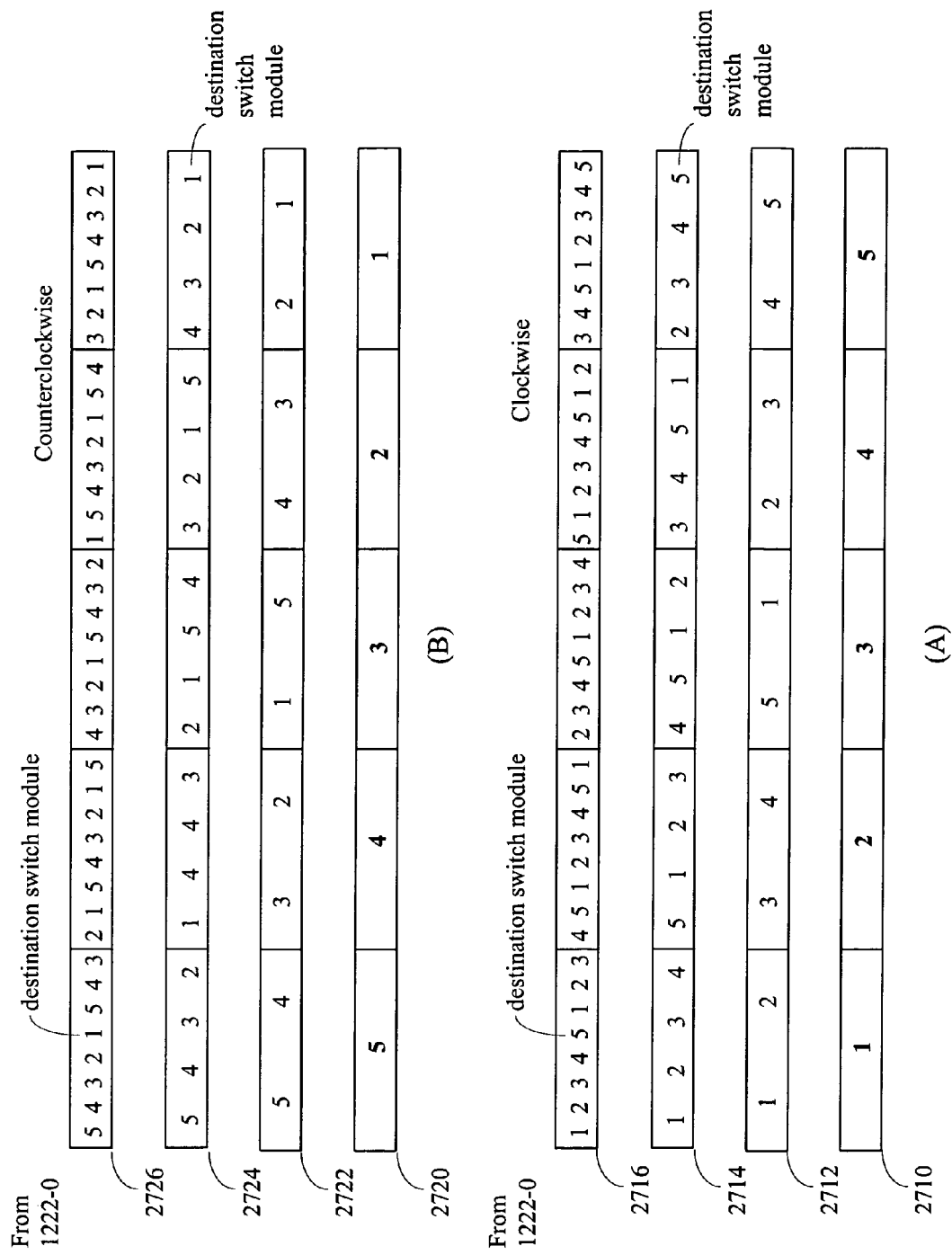
FIG. 27 illustrates the connectivity, through four pairs of complementary rotators of different speeds, of a switch module to other switch modules in a multi-speed circulating switch of the type illustrated in FIG. 12 having six switch modules, in accordance with an embodiment of the present invention.

FIG. 27, part A, illustrates the connectivity of a switch module 1222-0 in a rotorswitch 1200 having six switch modules 1222-0, 1222-1, 1222-2, 1222-3, 1222-4, and 1222-5 interconnected by four complementary rotator pairs {1220A, 1220a}, {1220B, 1220b}, {1220C, 1220c}, {1220D, 1220d}, having a speed ratio of 1:2:4:8. Switch module 1222-0 connects to switch modules 1222-1, 1222-2, 1222-3, 1222-4, and 1222-5 through the four clockwise rotators 1220A, 1220B, 1220C, and 1220-D, where a rotation phase of a rotator 1220A includes two rotation phases of rotator 1220B, four rotation phases of rotator 1220C, and eight rotation phases of rotator 1220D. During rotation phase 0 of the slower clockwise rotator 1220A, switch module 1222-0 connects to: switch module 1222-1 through clockwise rotator 1220A; switch module 1222-1 and 1222-2 through clockwise rotator 1220B; switch modules 1222-1, 1222-2, 1222-3, and 12224 through clockwise rotator 1220C; and switch modules 1222-1, 1222-2, 1222-3, 1222-4, 1222-5, 1222-1, 1222-2, and 1222-3, respectively, through the faster clockwise rotator 1220D. The connectivity through the clockwise rotators 1220A, 1220B, 1220C, and 1220D is illustrated by arrays 2710, 2712, 2714, and 2716, respectively, where a switch module 1222-k, $0 \leq k < 6$, is indicated by the suffix 'k'. The connectivity through the counterclockwise rotators of the four rotator pairs is illustrated in FIG. 27—part B—where, during rotation phase 0 of the slower counterclockwise rotator 1220a; switch module 1222-0 connects to: switch module 1222-5 through counterclockwise rotator 1220a; switch module 1222-5 and 1222-4 through counterclockwise rotator 1220b, switch modules 1222-5, 1222-4, 1222-3, and 1222-2 through counterclockwise rotator 1220c; and switch modules 1222-5, 1222-4, 1222-3, 1222-2, 1222-1, 1222-5, 1222-4, and 1222-3, respectively, through the faster counterclockwise rotator 1220d. The connectivity through the clockwise rotators 1220a, 1220b, 1220c, and 1220d is illustrated by arrays 2720, 2722, 2724, and 2726, respectively, where a switch module 1222-k, $0 \leq k < 6$, is indicated by the suffix 'k'.

Figure 28:
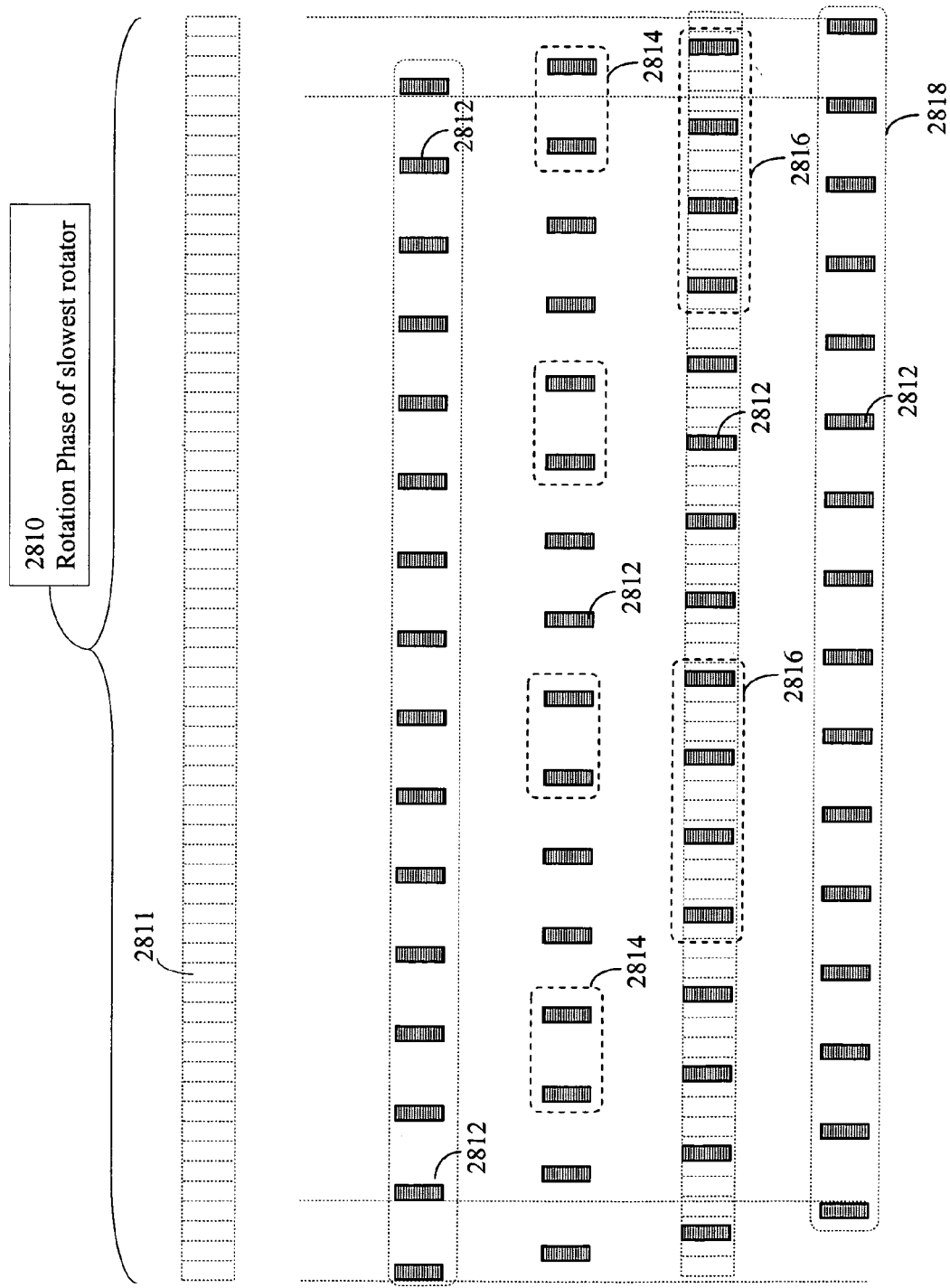
FIG. 28 illustrates the flow of data segments from a switch module in the multi-speed circulating switch of FIG. 12 to four rotators of different speeds, in accordance with an embodiment of the present invention.

FIG. 28 illustrates the flow of data segments from the common memory of a switch module 1222 in the multi-speed rotorswitch of FIG. 12 to four outbound ports connecting to four rotators having speed ratios of 1:4:8:16. During a time interval 2810 covering a rotation phase of the slowest rotator and divided into 64 time periods 2811 each sufficient to transfer a data segment, a data block 2818 comprising 16 data segments 2812 may be transferred through the slowest rotator to a single switch module, four data blocks 2816 each including four data segments 2812 may be transferred through the second slowest rotator to four consecutive switch modules, eight data blocks 2814 each including two data segments 2812 may be transferred through the second fastest rotator to eight consecutive switch modules, and sixteen data segments 2812 may be transferred through the fastest rotator to sixteen consecutive switch modules. It is important to note that a switch module 1222 may not connect to itself through a rotator and, hence, consecutive switch module as stated above would exclude the originating switch module. It is also noted that during a rotation phase of the slowest rotator, a faster rotator may connect a given switch module 1222 to another switch module 1222 more than once.

The described embodiments are to be considered as illustrative and not restrictive. It will be apparent to a person skilled in the art that variations and modifications to the embodiments may be made within the scope of the following claims.

I claim:

1. A multi-speed rotorswitch comprising:
   a plurality of switch modules each switch module having a module controller; and
   a plurality of rotator groups each rotator group comprising:
   a set of clockwise rotators, each clockwise rotator rotating at a respective rotation speed specific to said each rotator group from among a plurality of predefined rotation speeds; and
   a set of counterclockwise rotators, each counterclockwise rotator rotating at said respective rotation speed;

wherein said rotation speed specific to said each rotator group is different from a rotation speed of each other rotator group;

wherein each of said switch modules has a dual channel to each of said clockwise rotators and a dual channel to each of said counterclockwise rotators ofa each of said rotator groups.

2. The multi-speed rotorswitch of claim 1 wherein at least one of said clockwise rotators and said counterclockwise rotators is programmable to set its rotation speed.

3. The multi-speed rotorswitch of claim 1 wherein each rotation speed within said predefined rotation speeds is an integer multiple of a predefined minimum rotation speed so that said predefined rotation speeds bear rational relationships to each other.

4. The multi-speed rotorswitch of claim 1 wherein each of said clockwise rotators and said counterclockwise rotators connects each of said switch modules to each other of said switch modules during a rotation cycle having a plurality of rotation phases.

5. The multi-speed rotorswitch of claim 4 wherein said plurality of rotation phases includes a number of rotation phases equal to a total number, minus one, of switch modules in said plurality of switch modules.

6. The multi-speed rotator switch of claim 1 further including a master controller communicatively coupled to said module controller of said each switch module.

7. The multi-speed rotorswitch of claim 6 wherein said each of said switch modules is operable to:
receive connection requests each connection request indicating a destination switch module and a specified flow rate;
determine an internal data-unit size from among a plurality of predefined data-unit sizes according to said specified flow rate; and
communicate said specified flow rate and said internal data-unit size to said master controller.

8. The multi-speed rotorswitch of claim 7 wherein said master controller is further selects one of said clockwise rotators and one of said counterclockwise rotators for connecting said each of said switch modules to said destination switch module.

9. The multi-speed rotorswitch of claim 1 wherein each of said switch modules is operable to receive data from subtending data sources and send data to subtending data sinks.

10. The multi-speed rotorswitch of claim 9 wherein each of said switch modules includes a shared memory device organized into:
a shipping section for storing data received from said subtending data sources; transit sections for storing data directed to other switch modules, said transit sections including a transit section associated with each of said clockwise and counterclockwise rotators, each transit section including a memory division associated with said each of said switch modules; and
a receiving section for storing data to be transmitted to said subtending data sinks.

11. A multi-speed rotorswitch comprising:
a plurality of switch modules each switch module comprising an input module and an output module and having a module controller;
a plurality of transit planes each transit plane comprising:
a clockwise rotator rotating at a respective rotation speed specific to said each transit plane from among a plurality of predefined rotation speeds;
a counterclockwise rotator rotating at said respective rotation speed; and
a bank of transit-memory devices connecting said clockwise rotator to said counterclockwise rotator, each transit-memory device associated with a transit controller;
and
a master controller communicatively coupled to said module controller of said each switch module and with said transit controller of said each transit-memory device;
wherein said respective rotation speed specific to said each transit plane is different from a rotation speed specific to at least one other transit plane from among said plurality of transit planes; and
wherein said each switch module has a direct channel to each of said transit planes and a direct channel from each of said transit planes.

12. The multi-speed rotorswitch of claim 11 wherein each rotation speed is an integer multiple of a predefined minimum rotation speed from among said predefined rotation speeds so that said predefined rotation speeds bear rational relationships to each other.

13. The multi-speed rotorswitch of claim 11 wherein each of said switch modules is operable to:
receive connection requests each connection request indicating a destination switch module and a specified flow rate;
determine an internal data-unit size from among a plurality of predefined data-unit sizes according to said specified flow rate; and
communicate said specified flow rate and said internal data-unit size to said master controller for selecting one of said transit planes to connect said each switch module to said destination switch module.

14. A multi-grained rotorswitch comprising:
a plurality of switch modules; and
a plurality of rotors each rotor comprising a respective plurality of rotators of a common rotation speed characterizing said each rotor and differing from a rotation speed characterizing each other rotor;
wherein each of said switch modules
cyclically connects to each other switch module during each rotation cycle from among a plurality of rotation cycles having rotation-cycle durations bearing a one-to-one correspondence to said plurality of rotors, said each rotation cycle comprising a plurality of rotation phases; and
transmits during a rotation phase from among said plurality of rotation phases to a switch module from among said plurality of switch modules a number of data segments collectively occupying a time period not exceeding a duration of said rotation phase, said data segments destined for at least one of said switch modules.

15. The multi-grained rotorswitch of claim 14 wherein a duration of each of said data segments is determined according to a duration of said each rotation cycle.

16. The multi-grained rotorswitch of claim 15 wherein each of said unequal durations of said data segments is an integer multiple of a preset minimum duration.

17. The multi-grained rotorswitch of claim 16 wherein said integer multiple is a power of two.

18. The multi-grained rotorswitch of claim 16 wherein said integer multiple is a function of said flow rate.

19. The multi-grained rotorswitch of claim 14 further comprising a switch-module controller associated with each of said switch modules and a master controller in communication with said switch-module controller.

20. The multi-grained rotorswitch of claim 19 wherein said switch-module controller:

receives connection requests, each connection request specifying a destination switch module and a flow rate;

determines, according to said flow rate, a data-segment duration from a plurality of predefined data-segment durations;

communicates said each connection request to said master controller;

receives from said master controller:
- an identifier of a selected rotor from among said plurality of rotors; and
- a schedule for transmitting a succession of data segments through said selected rotor;

formulates said succession of data segments; and transmits said succession of data segments to said destination switch module.

* * * * *

UNITED STATES PATENT AND TRADEMARK OFFICE
CERTIFICATE OF CORRECTION

PATENT NO.        : 7,519,053 B2
APPLICATION NO.   : 11/211158
DATED             : April 14, 2009
INVENTOR(S)       : Beshai It is certified that error appears in the above-identified patent and that said Letters Patent is hereby corrected as shown below:

Two paragraphs from the spec were missing.

At Column 17, line 4 insert:

--A convenient way to build a contention-free common-memory-equivalent data switch is to use a rotating-access switch comprising a bank of transit memory devices sandwiched between two rotators of opposite directions where each memory device is logically divided into memory slots and memory slots of corresponding addresses in all of the transit memory devices are dedicated to a single data block. Such a structure is disclosed in United States patent 6,882,799 issued to Beshai *et al.* on April 19, 2005, and titled "multi-grained network" and further extended in Applicant's United States patent application 11/002,398 filed on December 02, 2004 and titled "Multi-Modal data switch", the specification of which is incorporated herein by reference.

The total number of data blocks that can be held simultaneously in the bank of transit memory devices in the above multi-modal data switch is determined by the number of memory slots per memory device. The number of transit memory devices preferably equals the number of dual ports of the switch module (a dual port being a paired input port and output port). The rotators are simple passive devices and may be initially configured to permit a significant dimension growth. Thus, the switch dimension (i.e., number of dual ports) may be increased by simply activating more rotator ports and adding transit memory devices. The access capacity of the rotating-access common memory switch module is proportional to the number of transit memory devices and, hence, the number of dual ports.--

UNITED STATES PATENT AND TRADEMARK OFFICE
CERTIFICATE OF CORRECTION

PATENT NO.        : 7,519,053 B2
APPLICATION NO. : 11/211158
DATED             : April 14, 2009
INVENTOR(S)       : Beshai It is certified that error appears in the above-identified patent and that said Letters Patent is hereby corrected as shown below:

At Column 23, line 5: should read as follows: said counterclockwise rotators of

At Column 23, line 38: should read as follows: master controller further

Signed and Sealed this

Sixth Day of October, 2009

David J. Kappos
*Director of the United States Patent and Trademark Office*